(12) United States Patent
Gao

(10) Patent No.: US 11,223,870 B2
(45) Date of Patent: Jan. 11, 2022

(54) METHOD AND DEVICE OF TRANSMITTING AND RECEIVING ULTRA HIGH DEFINITION VIDEO

(71) Applicant: SHENZHEN LENKENG TECHNOLOGY CO., LTD., Shenzhen (CN)

(72) Inventor: Binghai Gao, Shenzhen (CN)

(73) Assignee: SHENZHEN LENKENG TECHNOLOGY CO., LTD., Shenzhen (CN)

( * ) Notice: Subject to any disclaimer, the term of this patent is extended or adjusted under 35 U.S.C. 154(b) by 94 days.

(21) Appl. No.: 16/749,976

(22) Filed: Jan. 22, 2020

(65) Prior Publication Data
US 2020/0245011 A1   Jul. 30, 2020

(30) Foreign Application Priority Data

Jan. 25, 2019   (CN) .......................... 201910072476.9
Jan. 25, 2019   (CN) .......................... 201920142300.1

(51) Int. Cl.
*H04N 21/2662* (2011.01)
*H04N 19/91* (2014.01)
*H04N 7/01* (2006.01)
*H04N 21/4363* (2011.01)
*H04L 29/06* (2006.01)

(52) U.S. Cl.
CPC ..... *H04N 21/2662* (2013.01); *H04L 65/4084* (2013.01); *H04L 65/607* (2013.01); *H04L 65/608* (2013.01); *H04N 7/0125* (2013.01); *H04N 19/91* (2014.11); *H04N 21/43635* (2013.01)

(58) Field of Classification Search
CPC ......... H04N 21/2662; H04N 21/43635; H04N 19/91; H04L 65/4084; H04L 65/607; H04L 65/608
See application file for complete search history.

(56) References Cited

U.S. PATENT DOCUMENTS

2017/0149856 A1* 5/2017 Liu .................... H04N 21/2381
2020/0068050 A1* 2/2020 Foo .................... G06F 9/30098

* cited by examiner

*Primary Examiner* — Jefferey F Harold
*Assistant Examiner* — Franklin S Andramuno

(57) ABSTRACT

Method and device of transmitting and receiving ultra high video are provided. The method of transmitting ultra high definition video includes: acquiring ultra high definition video; compressing data, by a compression algorithm to obtain compressed data, of the ultra high definition video; packing the compressed data into user datagram protocol (UDP) data packets; transmitting the UDP data packets to a first 10-gigabit network module according to a UDP protocol. The compressed data is packaged into the UDP data packets and the UDP data packets are transmitted by the 10-gigabit network module, thereby realizing the high-efficiency transmission of video data based on the 10-gigabit network and UDP protocol stack. A transmission system is also provided.

17 Claims, 15 Drawing Sheets

METHOD AND DEVICE OF TRANSMITTING AND RECEIVING ULTRA HIGH DEFINITION VIDEO

CROSS REFERENCE TO RELATED APPLICATIONS

This application claims priority to Chinese Patent Application Serial No. 201910072476.9 on 25 Jan. 2019, and Chinese Patent Application Serial No. 201920142300.1 on 25 Jan. 2019, the disclosures of both of which are hereby incorporated by reference.

TECHNICAL FIELD

The disclosure relates to the field of video transmission technology, and in particular to a method and device of transmitting ultra high definition video, and a method and device of receiving ultra high definition video.

BACKGROUND

At present, people are increasingly demanding for video quality, and ultra high definition video is becoming more and more popular. However, existing ultra high definition video usually needs to be transmitted by an expensive HDMI cable, which is very unfriendly for long-distance transmission.

SUMMARY

According to implementations, a method and device of transmitting ultra high definition video, and a method and device of receiving ultra high definition video are provided, which can transmit ultra-high-definition video via a 10-gigabit network, or directly transmit the ultra high definition video through a network cable such as class V line or class VI line.

According to a first aspect of implementations, a method of transmitting ultra high definition video is provided. The method includes the following. Ultra high definition video is acquired. Data of the ultra high definition video is compressed by a compression algorithm to obtain compressed data. The compressed data is packed into UDP data packets. The UDP data packets are transmitted to a first 10-gigabit network module according to a UDP protocol.

In some implementations, the compression algorithm is a display stream compression (DSC) compression algorithm or a variable length coding (VLC) compression algorithm.

In some implementations, the first 10-gigabit network module is configured to transmit the UDP data packets to a receiving device or a 10-gigabit switch.

In some implementations, the method of transmitting ultra high definition video further includes a step of acquiring transmitting-end control data. The compressed data is packed into the UDP data packets as follows. The compressed data and the transmitting-end control data are encapsulated into a data frame according to a preset protocol. The data frame is packed into the UDP data packets.

In some implementations, the method of transmitting ultra high definition video further includes the following. Receiving-end UDP data packets from the first 10-gigabit network module is acquired. A data frame from the receiving-end UDP data packets is unpacked, where the data frame includes receiving-end control data. Corresponding task is executed in response to the receiving-end control data.

In some implementations, the method of transmitting ultra high definition video further includes the following. Analog-to-digital conversion is performed on received infrared signal to obtain analog-to-digital converted data. The analog-to-digital converted data is packed into a transmitting-end remote control UDP packet. The transmitting-end remote control UDP packet is transmitted to the first 10-gigabit network module. The receiving-end remote control UDP data packet is unpacked to obtain unpacked data, if the receiving-end remote control UDP packet transmitted by a receiving device is acquired through the first 10-gigabit network module. Digital-to-analog conversion is performed on the unpacked data to obtain a first converted result, and the transmitting-end infrared emission tube is controlled to transmit second infrared signal according to the first converted result signal.

In some implementations, a port number of the UDP packet is different from that of the transmitting-end remote control UDP packet, and the port number of the UDP packet is different from that of the receiving-end remote control UDP data packet.

According to a second aspect of implementations, a method of receiving ultra high definition video is provided. The method includes the following. UDP data packets are acquired from a second 10-gigabit network module to according a UDP protocol. The UDP data packets are unpacked to obtain data to be decompressed. The data to be compressed is decompressed through a decompression algorithm to obtain data of the ultra high definition video.

In some implementations, the decompression algorithm is a DSC decompression algorithm or a VLC decompression algorithm.

In some implementations, the second 10-gigabit network module is configured to acquire the UDP data packets from a transmitting device or acquiring the UDP data packets transmitted by the transmitting device from a 10-gigabit switch.

In some implementations, the UDP data packets are unpacked to obtain data to be compressed as follows. The UDP data packets are unpacked to obtain the data frame, where the data frame includes the data to be decompressed and transmitting-end control data. The method further includes as follows. The ultra high definition video is played according to the transmitting-end control data.

In some implementations, the method of receiving ultra high definition video further includes the following. Receiving-end control data is acquired. The receiving-end control data is encapsulated into a data frame according to a preset protocol. The data frame is packed into a receiving-end control UDP data packet. The receiving-end control UDP data packet is transmitted to the second 10-gigabit network module.

In some implementations, the method of receiving ultra high definition video includes the following. Analog-to-digital conversion is performed on received infrared signal to obtain analog-to-digital converted data. The analog-to-digital converted data is packed into a receiving-end control remote control UDP packet. The receiving-end remote control UDP packet is transmitted to the second 10-gigabit network module. A transmitting-end remote control UDP packet is unpacked to obtain unpacked data, when the transmitting-end remote control UDP packet transmitted by a transmitting device is acquired through the second 10-gigabit network module. Digital-to-analog conversion is performed on the unpacked data to obtain a second converted result and an infrared emission tube is controlled to transmit infrared signal in response to the second conversion result.

A transmitting device of transmitting ultra high definition video is provided. The transmitting device of transmitting ultra high definition video includes the following. An HDMI input interface, a compressing module, a user datagram protocol (UDP) transmitting module, and a first 10-gigabit network module. The HDMI input interface is configured to acquire ultra high definition video. The compressing module is connected with the HDMI input interface and is configured to compress data in the ultra high definition video to obtain compressed data. The UDP transmitting module is connected with the compressing module and is configured to pack the compressed data into UDP data packets UDP transmitting module. The first 10-gigabit network module is connected with the UDP transmitting module and is configured to transmit the UDP data packets.

In some implementations, the transmitting device of transmitting ultra high definition video further includes a first communication unit connected between a first control device and the UDP transmitting module, where the UDP transmitting module is further configured to acquire the transmitting-end control data through the first communication unit and to pack the compressed data and the transmitting-end control data into the UDP data packets.

In some implementations, the transmitting device of transmitting ultra high definition video further includes a transmitting-end infrared receiving tube and a first analog-to-digital converting module. The transmitting-end infrared receiving tube, where the first analog-to-digital converting module is configured to receive infrared signal and the first analog-to-digital converting module is configured to perform analog-to-digital conversion on the infrared signal to obtain analog-to-digital converted data. The transmitting device of transmitting ultra high definition video further includes a first digital-to-analog converting module and a receiving-end infrared emission tube. The UDP transmitting module is further configured to pack the analog-to-digital converted data into a transmitting-end remote control UDP packet, and transmit the transmitting-end remote control UDP packet to the first 10-gigabit network module; the UDP protocol transmitting module is further configured to acquire a receiving-end remote control UDP packet from receiving-end through the first 10-gigabit network module, and to unpack the receiving-end remote control UDP packet to obtain unpacked data; the first digital to analog converting module is configured to perform digital-to-analog conversion on the unpacked data to obtain a first converted result and to control the transmitting-end infrared emission tube to transmit infrared signal according to the first converted result.

A device of receiving ultra high definition video is provided, the device of receiving ultra high definition video includes a second 10-gigabit network module. The second 10-gigabit network module is configured to acquire a UDP data packet. A UDP receiving module is connected with the second 10-gigabit network module and is configured to acquire the UDP data packet from the second 10-gigabit network module according to a UDP protocol and to decapsulate data to be decompressed from the UDP data packet. A decompressing module is connected with the UDP receiving module and is configured to decompress the data to be decompressed to obtain data in the ultra high definition video. A HDMI output interface is connected with the decompressing module and is configured to output the ultra high definition video.

In some implementations, the second 10-gigabit network module is configured to transmit the UDP data packets to a transmitting device or a 10-gigabit switch.

In some implementations, the receiving device of receiving ultra high definition video further includes a second communication unit connected between a second control device and the UDP receiving module, where the UDP receiving module is further configured to receive, via the second communication unit, receiving-end control data, to pack the receiving-end control data into receiving-end UDP data packets, and to transmit the receiving-end UDP data packets to the second 10-gigabit network module.

In some implementations, the receiving device of receiving ultra high definition video further includes a receiving-end infrared receiving tube and a second analog-to-digital converting module. The second analog-to-digital converting module is configured to perform analog-to-digital conversion on the infrared signal received by the receiving-end infrared receiving tube to obtain converted data. The UDP receiving module is further configured to pack all converted data into a receiving-end remote control UDP data packet, and to transmit the receiving-end remote control UDP data packet to the second 10-gigabit network module.

In some implementations, the device of receiving ultra high definition video further includes a receiving-end infrared emission tube and a second analog-to-digital converting module. The second analog-to-digital converting module is configured to acquire transmitting-end remote control UDP data packet transmitted by a transmitting device through the second 10-gigabit network module and to decompress the transmitting-end remote control UDP packet. The second analog-to-digital converting module is configured to perform analog-to-digital conversion on the decompressed transmitting-end remote control UDP packet to obtain a converted result, and to control the receiving-end infrared emission tube to transmit infrared signal according to the converted result transmitting-end infrared emission tube signal.

According to implementations, a transmission system is provided. The transmission system includes the device of receiving ultra high definition video and the device of transmitting ultra high definition video as mentioned above.

According to the method of transmitting and receiving ultra high video, the compressed data is packaged into the UDP data packets and the UDP packets are transmitted via the 10-gigabit network module, such that video data can be effectively transmitted based on 10-gigabit network and UDP protocol stack, and the maximum data transmission bandwidth can reach 8.7 Gbps.

BRIEF DESCRIPTION OF THE DRAWINGS

In order to describe technical solutions in implementations more clearly, the following briefly describes accompanying drawings required for describing the implementations. The accompanying drawings in the following description only illustrates some implementations, and a person of ordinary skill in the art can further obtain other accompanying drawings according to these accompanying drawings without any creative effort.

DETAILED DESCRIPTION OF THE PREFERRED IMPLEMENTATIONS

In order to enable those skilled in the art to better understand technical solutions in the implementations, technical solutions embodied in implementations of the disclosure will be described in a clear and comprehensive manner in conjunction with the accompanying drawings. It is evident that the implementations described herein are merely some rather than all of the implementations. All other implementations obtained by those of ordinary skill in the art based on the implementations of the disclosure without creative efforts shall fall within the protection scope of the disclosure.

It should be noted that, if not conflicting, each feature in the implementations of the present invention may be combined with each other, and are all within the protection scope of the present invention. In addition, although the functional modules are divided in the schematic view of the apparatus and the logical sequence is shown in the flowchart, in some other cases, the functional modules can be divided in a different manner and the steps can be performed in a different logical sequence.

Figure 1:
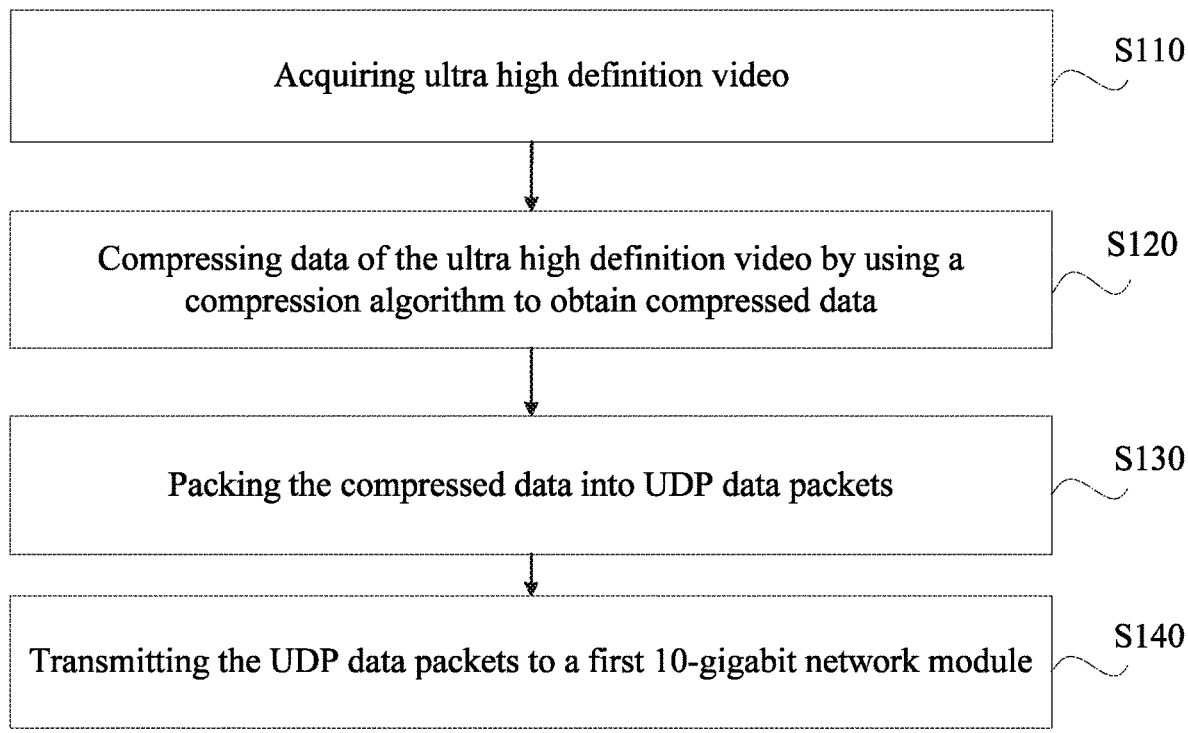
FIG. 1 is a flow chart illustrating a method of transmitting ultra high definition video according to implementations.

FIG. 1 is a flow chart illustrating a method of transmitting ultra high definition video according to implementations. The method of transmitting ultra high definition video begins at S110.

At S110, ultra high definition video is acquired.

In some implementations, the ultra high definition video may be acquired from High Definition Multimedia Interface (HDMI) inputs (such as set-top box, computer hosts, DVD and so on). The acquired ultra high definition video has the following features: a resolution of 4K, a frame rate of 60 FPS, a YUV coding scheme of 4:4:4, 8-bit depth RGB mode or High Dynamic Range Imaging (HDRI).

At S120, data of the ultra high definition video is compressed by using a compression algorithm to obtain compressed data.

In some implementations, the data of the ultra high definition video is compressed by using display stream compression (DSC) algorithm. In other implementations, the data of the ultra high definition video is compressed by using Lossless Data Compression algorithm such as a variable length coding (VLC) algorithm to achieve compression of zero latency.

In some implementations, the total data bandwidth of YUV video, 4K/60, HDMI2.0 standard and 4:4:4 is $4096*2250*8*3*60=13.271$ Gbps, and considering some additional data, the total data bandwidth of the video is up to 18 Gbps. The compression rate of DSC algorithm may be 2-4 times relative to the total data and the video after compression has a total data bandwidth of 4.5 Gbps-9 Gbps.

At S130, the compressed data is packed into UDP data packets.

UDP is an abbreviation of User Datagram Protocol which refers to a connectionless transport layer protocol of Open System Interconnection (OSI) reference model. The UDP provides a transaction oriented simple unreliable information delivery service. IETF RFC 768 is the formal specification of UDP. Similar to Transmission Control Protocol (TCP), the UDP is directly on the top layer of Internet Protocol (IP). According to the OSI reference model, both UDP and TCP belong to a transport layer protocol. UDP protocol is mainly used to compress the network data traffic into data packets. One typical data packet is in the form of a transmission unit of the binary data. The first 8 bytes of each data packet represent a header information, and the remaining bytes represent transmission data.

In some implementations, the data of the ultra high definition video which has been subjected to lossless compression may be processed and transmitted over the network according to the high efficient UDP protocol stack.

In some implementations, the high efficient UDP protocol stack is implemented on Field Programmable Gate Array (FPGA) by using a hardware description language, and a height of the 64 bit width used in the protocol stack is parallelly, such that latency of the protocol stack processing may be greatly reduced and UDP protocol processing can only be realized in the microsecond level.

In some implementations, the length of the UDP data packet which is obtained by packing the compressed data is larger than 1500 bytes. UDP protocol processing may overcome the length limit of 1500 bytes of a conventional single frame, can support efficient Ethernet protocol and support jumbo frame protocol of the maximize length of 9000 bytes.

At S140, the UDP data packets are transmitted to a first 10-gigabit network module according to a UDP protocol.

In the present implementation, the UDP data packets are transmitted through the first 10-gigabit network. Exemplary, the first 10-gigabit network module includes a 10-gigabit network card and a 10-gigabit network port. The 10-gigabit network port is directly connected with a receiving device through a network cable, or is indirectly connected with the receiving device through a network device such as a 10-gigabit switch. The first 10-gigabit network module is configured to transmit the UDP data packets to the receiving device or the 10-gigabit switch.

In some implementations, a maximum transmission unit of the first 10-gigabit network module is larger than 1500 bytes.

The Maximum Transmission Unit (MTU) refers to a size of the maximum data packets passing through a certain layer of a communication protocol. Typically the parameter of the MTU is related to the communication interface, such as network interface cards, serial ports etc. The MTU of the first 10-gigabit network module is set to be larger than 1500 bytes such that the first 10-gigabit network module can match the jumbo frame protocol, the number of data packets in the network may be reduced, and additional cost of processing the header of the data packets may be reduced. In a conventional Gigabit Ethernet network, there are approximately 81000 data packets passing through the network per second, whereas in the network of a jumbo frame being used, the number of the data packets passing through the network per second is reduced to 14000. In the 10-gigabit network, the number of the data packets passing through the network per second may be sharply reduced. A frame with a frame length of standard 1518 in a standard network has 812000 data packets passing through the network per second, while in a network using the jumbo frame technology there are only 14000 data packets passing through the network per second, which greatly reduces the number of the frames and improves the performance significantly, such that the actual effective transmission data bandwidth of the first 10-gigabit network module can reach 8.7 Gbps, such that the ultra high definition video can be transmitted, via a low-cost 10-gigabit network, with the Lossless Data Compression of zero delay, thereby achieving standard industry requirement.

Figure 2:
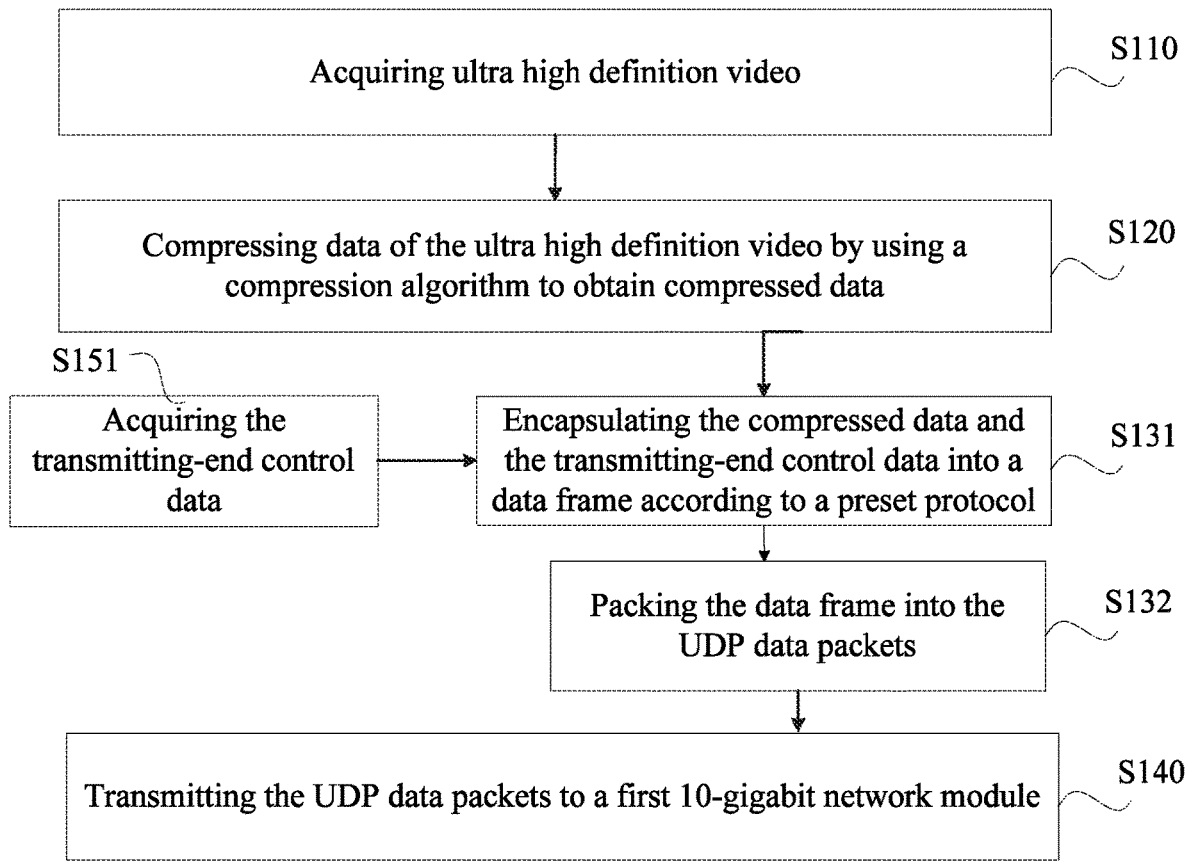
FIG. 2 is a flow chart illustrating a method of transmitting ultra high definition video according to other implementations.

In some implementations, as illustrated in FIG. 2, the method of transmitting ultra high definition video further includes the following.

At S151, the transmitting-end control data is acquired.

In some implementations, the transmitting device includes a communication module connected with the first control device. Exemplary, the communication module includes a network control interface which can be connected with the first control device such as a computer through TCP/IP protocol. Alternatively, the first communication unit 160 includes a USB interface or an RS232 interface which can be connected with the first control device 10 such as a mouse, a keyboard etc. The transmitting-end control data transmitted by the first control device 10 such as a computer, a mouse, a keyboard etc. can be transmitted, through the first communication unit 160, to the transmitting device 100. Thus, the transmitting device 100 can acquire the transmitting-end control data.

In the implementations, operations corresponding to at S130 include as follows.

At S131, the compressed data and the transmitting-end control data are encapsulated into a data frame according to a preset protocol.

Exemplary, according to the preset framing protocol, the compressed data and the transmitting-end control data are encapsulated into a data frame with a preset format. For example, the format of the data frame is: a header of several bytes, followed by the transmitting-end control data, the compressed data, and check data.

At S132, the data frame is packed into the UDP data packets.

In some implementations, both the data frame obtained by encapsulating the compressed data and the transmitting-end control data are packed into multiple UDP data packets, each of which has a length larger than 1500 bytes such that in S140 the UDP data packets can be transmitted to a receiving device via the first 10-gigabit network module, whereby the receiving device can obtain the transmitting-end control data according to the UDP data packets, and can perform, in response to the transmitting-end control data, the corresponding control function, such as startup, shutdown, adjusting of playing resolution, playing window, and the like.

In some implementations, the method of transmitting ultra high definition video further includes the following. Receiving-end UDP data packets are acquired from the first 10-gigabit network module. The data frame is unpacked from the receiving-end UDP data packet, where the data frames includes the receiving-end control data. The corresponding task is performed according to the receiving-end control data.

In some implementations, the receiving device also includes a corresponding communication module. The communication module is connected with the second control device. Exemplary, the communication module includes a USB interface or a RS232 interface configured to connect with a second control device such as a mouse, a keyboard etc. Via the second control device, the receiving-end UDP data packets of receiving-end control data can be transmitted to the transmitting device through the second 10-gigabit network module of the receiving device. That is, the transmitting device may obtain the receiving-end UDP data packets from the first 10-gigabit network module.

In some implementations, the receiving device encapsulates the obtained receiving-end control data into a data frame, and packs the data frame into UDP data packets to be transmitted to the transmitting device. The transmitting device unpacks the UDP data packets and obtains the receiving-end control data according to the preset framing protocol.

In some implementations, after the transmitting device unpacks the receiving-end UDP data packet to obtain the receiving-end control data, the receiving-end control data can be transmitted to the first control device (such as computers and the like) through the communication module connected with the first control device.

Based on the receiving-end control data, the transmitting device can perform the corresponding function, such as startup, shutdown, adjusting of the playing content and the like.

Figure 3:
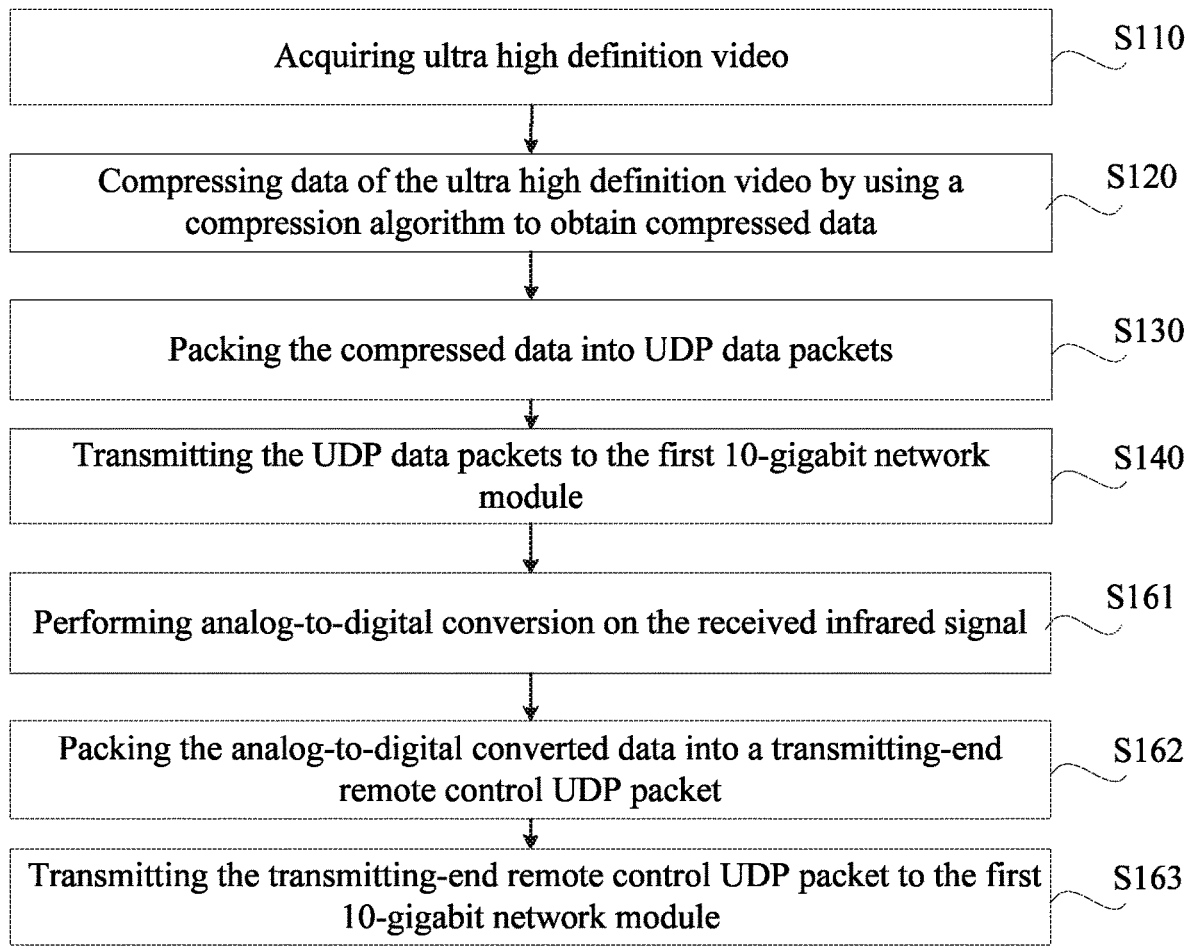
FIG. 3 is a flow chart illustrating a method of transmitting ultra high definition video according to other implementations.

In some implementations, as illustrated in FIG. 3, the method of transmitting ultra high definition video may further includes the following.

At S161, analog-to-digital conversion is performed on the received infrared signal.

In some implementations, the transmitting device receives, via transmitting-end infrared receiving tube, infrared signal transmitted by an external remote controller and performs analog-to-digital conversion on the received infrared signal via the analog-to-digital converting module to achieve a full sampling of the infrared signal.

At S162, the analog-to-digital converted data is packed into a transmitting-end remote control UDP packet.

Exemplary, all analog-to-digital converted data without demodulation and decoding is directly packaged as a transmitting-end remote control UDP packet. The transmitting-end remote control UDP packet and the UDP data packet are mutually independent from each other.

At S163, the transmitting-end remote control UDP packet is transmitted to the first 10-gigabit network module.

In some implementations, a port number of the transmitting-end remote control UDP packet in S163 is different from a port number of the UDP data packet in S140. Thus, the transmitting-end remote control UDP packet and the UDP data packet are transmitted independently according to the different port numbers, so that the transmitting-end remote control UDP packet can be transmitted to the receiving device via the first 10-gigabit network module much timely.

Exemplary, after an external remote controller transmits an infrared signal to the transmitting-end infrared receiving tube of the transmitting device and the infrared signal is transmitted to the receiving device, the receiving device obtains the infrared signal through the digital-to-analog conversion module and the receiving-end infrared emission tube and transmits the infrared signal to a device such as a display device, so as to achieve an transmitting-end external remote controller remotely controlling of the display device connected with the receiving device, such as for adjusting display brightness, saturation and the like.

Figure 4:
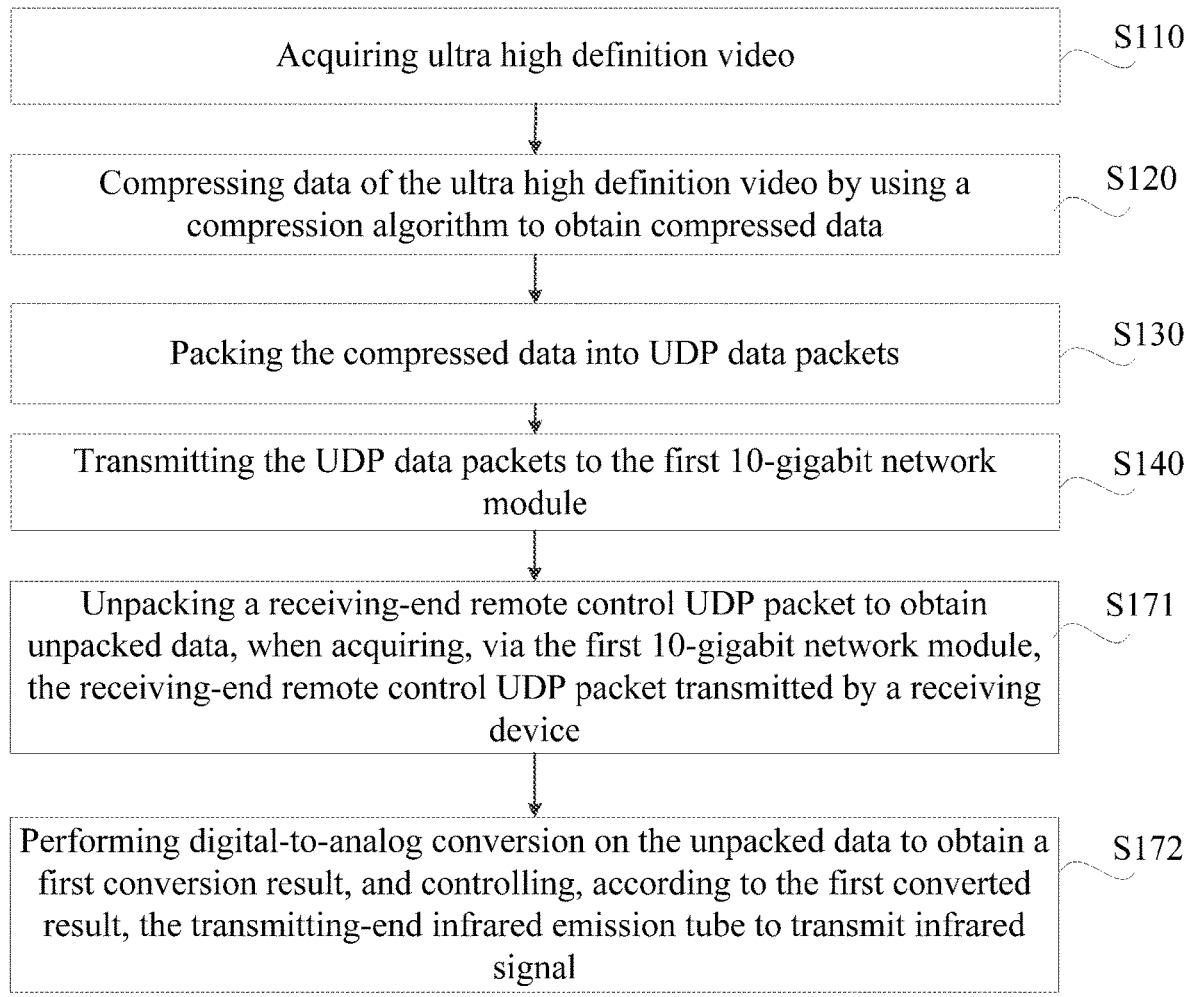
FIG. 4 is a flow chart illustrating a method of transmitting ultra high definition video according to other implementations.

In other implementations, as shown in FIG. 4, the method of transmitting ultra high definition video method further includes the following.

At S171, if a receiving-end remote control UDP packet transmitted by a receiving device is acquired via the first 10-gigabit network module, the receiving-end remote control UDP packet is unpacked to obtain unpacked data.

In the present implementations, the receiving device receives infrared signal transmitted from an external remote controller through the receiving-end infrared receiving tube, and performs analog-to-digital conversion on the infrared signal received by the receiving-end infrared receiving tube. Then the full sampled the infrared signal is packed into a receiving-end remote control UDP packet which is transmitted to the first 10-gigabit network module of the receiving device.

If the transmitting device obtains the receiving-end remote control UDP packet transmitted by the receiving device through the first 10-gigabit network module, the receiving-end remote control UDP packets are unpacked.

At S172, digital-to-analog conversion is performed on the unpacked data to obtain a first conversion result and the transmitting-end infrared emission tube is controlled to transmit infrared signal according to the first converted result.

Exemplary, the external remote controller transmits, via the receiving-end infrared receiving tube, infrared signal to the receiving device. After the infrared signal is transmitted to the transmitting device, the transmitting device obtains the infrared signal through digital-to-analog conversion module and the transmitting-end infrared emission tube and transmits the achieve an receiving-end external remote controller remotely controlling infrared signal to video source devices such as set-top boxes, computer hosts, DVD etc., so as to the video source devices connected with the transmitting device, such as switching transmission of video and other tasks.

In some implementations, the port number of the UDP data packet in S140 is different from that of the transmitting-end remote control UDP packet in S171.

In some implementations, before the operations corresponding to S120, further includes the following.

At S101, a first control parameter is obtained, and the ultra high definition video is processed according to the first control parameter to obtain processed data of the ultra high definition video. The ultra high definition video is compressed through a compression algorithm of S120 includes as follows. The processed data of the ultra high definition video is compressed by the compression algorithm.

In some implementations, a first control parameter is obtained, and the ultra high definition video is processed according to the first control parameter to obtain processed data of the ultra high definition video of S101 includes as follows.

A part of the ultra high definition video is acquired according to a fast forward/fast backward instruction of the first control parameter, another ultra-high-definition video file is acquired according to a video switching instruction of the first control parameter, and an ultra high definition video is zoomed according to a zoom instruction of the first control parameter.

Figure 5:
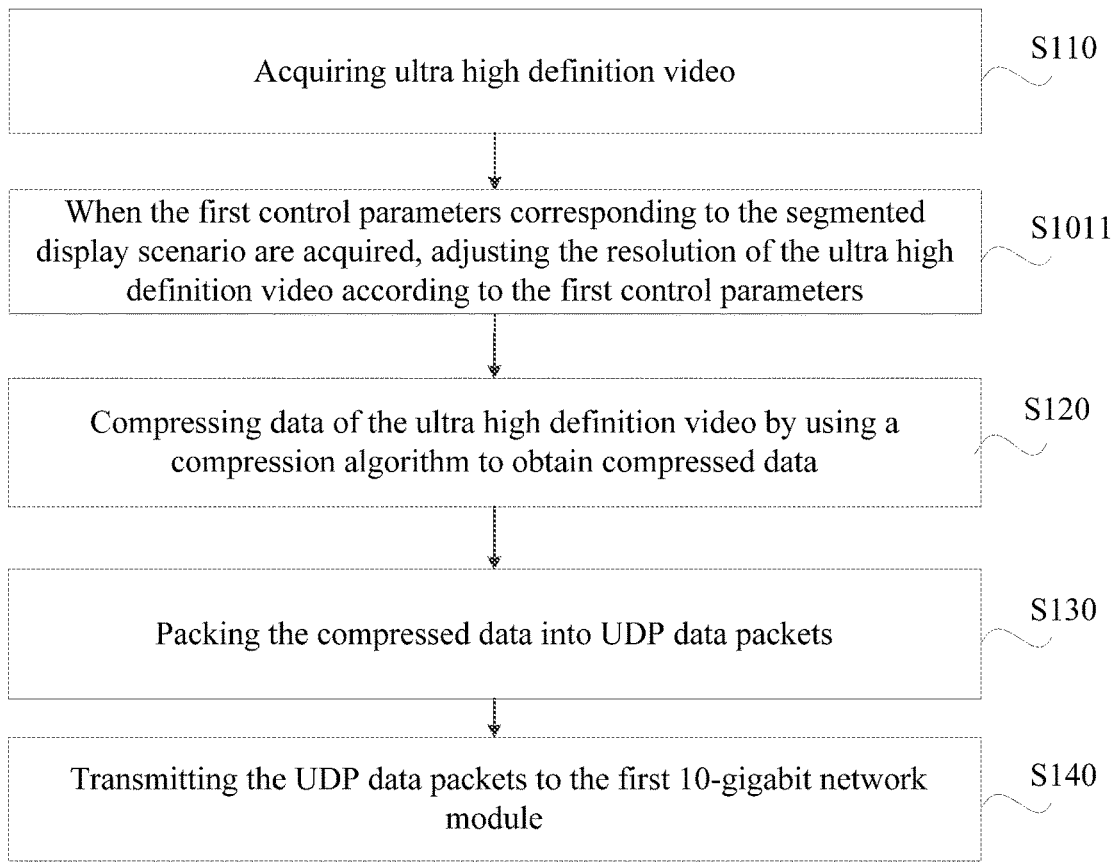
FIG. 5 is a flow chart of a method of transmitting ultra high definition video according to other implementations.

In some implementations, as shown in FIG. 5, a first control parameter is obtained, and the ultra high definition video is processed according to the first control parameter to obtain processed data of the ultra high definition video includes as follows.

At S1011, if first control parameters corresponding to the segmented display scenario are acquired, the resolution of the ultra high definition video is adjusted according to the first control parameters corresponding to the segmented display scenario.

In the present implementation, the segmented display scenario refers to a plurality of ultra high definition videos displayed on a display. For example, four-channel ultra high definition videos transmitted from four transmitting devices are respectively displayed on an upper left region, a lower left region, an upper right region and a lower right region of the display.

In some implementations, when the method of transmitting ultra high definition video is applicable to a scenario in which a display screen of the display is split, if resolution of the ultra high definition video acquired by the operations corresponding to S110 is 4K and the resolution of video displayed on the display is also 4K, when receiving, via an operator, inputs of the first control parameter corresponding to the segmented display scenario, and the ultra high definition video with the resolution of 4K acquired, by the first control parameter, will be adjusted to a resolution of 1080P. Finally, the receiving device captures four-channel videos with a resolution of 1080P and combines the four-channel videos into the ultra high definition video with the resolution of 4K, the four-channel videos are spliced into a upper left region, a lower left region, an upper right region, and a lower right region, respectively, and are transmitted to the display for display, thereby four-channel ultra high definition videos transmitted by the transmitting device are simultaneous viewed on a display.

Figure 6:
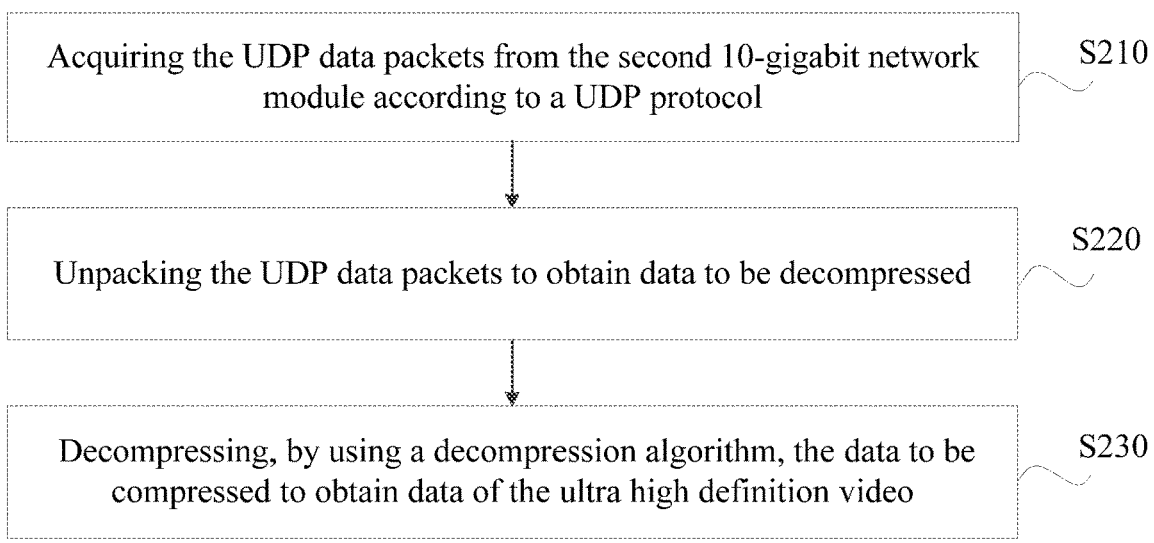
FIG. 6 is a flow chart illustrating a method of receiving ultra high definition video according to implementations.

FIG. 6 shows a flow chart of the receiving method of the ultra high definition video. The receiving method of the ultra high definition video includes the following.

At S210, the UDP data packets are acquired from the second 10-gigabit network module according to UDP protocol.

In some implementations, the length of the UDP data packets are larger than 1500 bytes, and the maximum transmission unit of the second 10-gigabit network module is larger than 1500 bytes.

In the present implementation, UDP data packets are received through 10-gigabit network. Exemplary, the second 10-gigabit network module includes 10-gigabit network cards and 10-gigabit ports. The 10-gigabit ports are connected with the transmitting device directly or through network devices such as a 10-gigabit switch. The second 10-gigabit network module is configured to acquire UDP data packets transmitted by the transmitting device or acquire, via the 10-gigabit switch UDP data packets transmitted by the transmitting device.

Since the maximum transmission unit of the second 10-gigabit network module is larger than 1500 bytes, the second 10-gigabit network module can match the jumbo frame protocol, so as to the number of data packets in the network is reduced and additional cost of processing the header of the data packets is reduced.

At S220, the UDP data packets are unpacked to obtain data to be decompressed.

In some implementations, UDP data packets are received and then unpacked according to the high efficient UDP protocol stack. In some implementations, the high efficient UDP protocol stack is implemented in the FPGA by using a hardware description language, and a height of the 64 bit width used in the protocol stack is parallelly, such that latency of the protocol stack processing may be greatly reduced and UDP protocol processing can only be realized in the microsecond level.

At S230, the data to be compressed is decompressed, by a decompression algorithm, to obtain data of the ultra high definition video.

In some implementations, the data of the ultra high definition video is decompressed through Display Stream Decompression (DSD) decompression algorithm. In some other implementations, the data of the ultra high definition video is decompressed through a Visually Lossless Decompression (VLD) algorithm such as VLD algorithm and the like, where a zero delay decompression is achieved.

In some implementations, after the S230, the ultra high definition video is transmitted, by HDMI 2.0, to the display to be displayed.

Figure 7A:
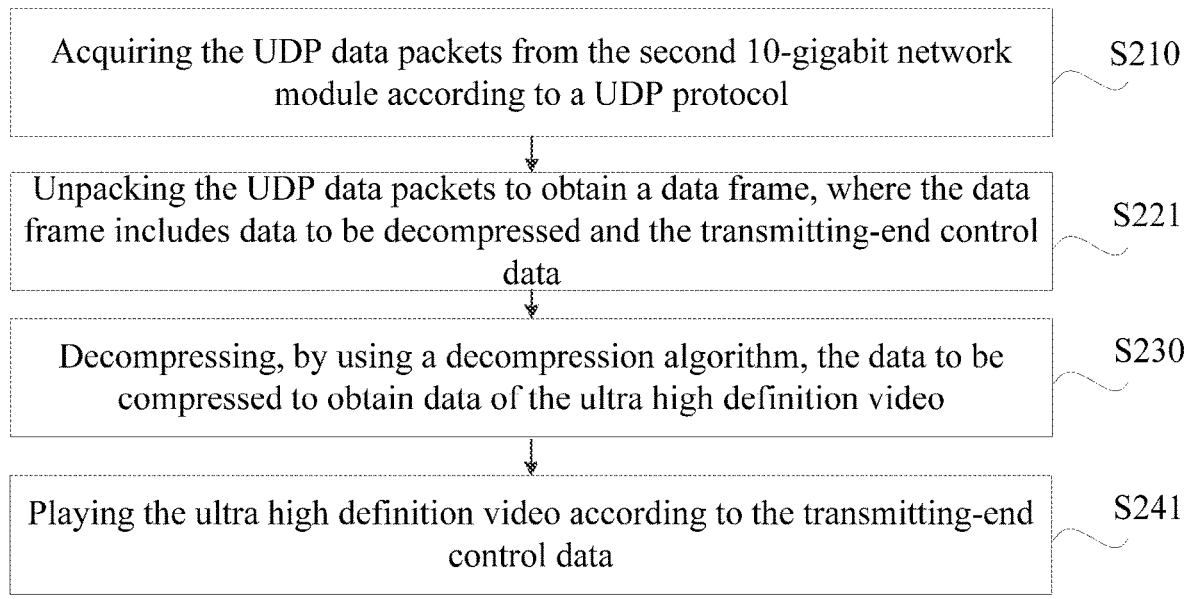
FIG. 7A is a flow chart illustrating a method of receiving ultra high definition video according to other implementations.

In some implementations, as shown in FIG. 7A, the operations corresponding to S220 specifically includes the following.

At S221, the UDP data packets are unpacked to obtain a data frame, where the data frame includes data to be decompressed and the transmitting-end control data.

In the present implementation, the transmitting device acquires, via a communication module, transmitting-end control data transmitted by the first control device such as computers, encapsulates the compressed data and the transmitting-end control data into a data frame, packs the data frame into UDP data packets and transmits the UDP data packets to the receiving device. The receiving device unpacks the UDP data packets to obtain, according to the preset framing protocol, data to be decompressed configured to decompressed and played and transmitting-end control data.

The method of receiving ultra high definition video further includes the following.

At S241, the ultra high definition video is played according to the transmitting-end control data.

, the receiving device may perform, according to the transmitting-end control data, corresponding control functions, such as startup, shutdown, adjusting of playing resolution, playing window and the like.

Figure 7B:
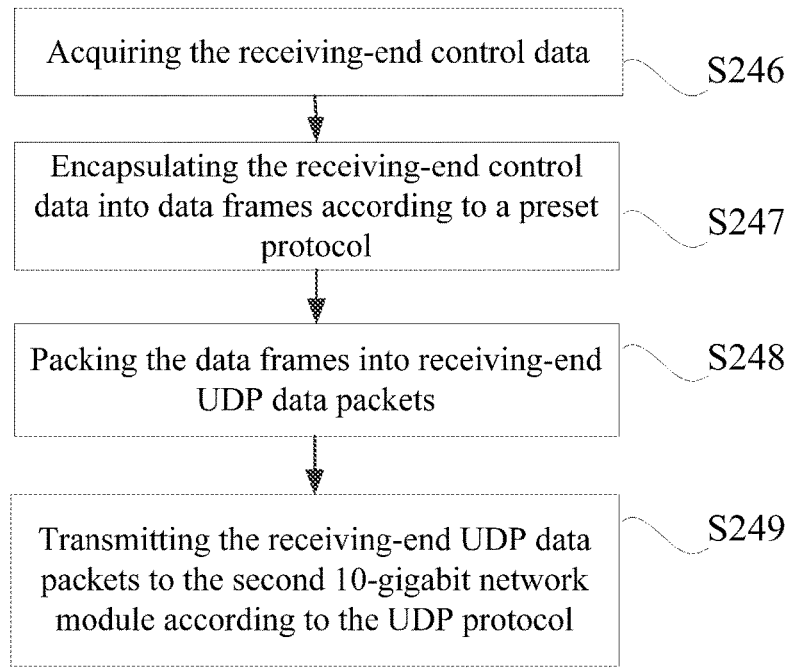
FIG. 7B is a flow chart illustrating a method of receiving ultra high definition video according to other implementations.

In some implementations, as shown in FIG. 7B, the method of receiving ultra high definition video further includes the following.

At S246, the receiving-end control data is acquired.

In some implementations, the receiving device includes corresponding communication modules configured to connect with the second control device. Exemplary, the communication module includes network control interfaces, USB interfaces or RS232 interfaces, where the communication module may be connected with the second control device such as a computer, a mouse, a keyboard etc. The receiving-end control data may be acquired through the second control device.

At S247, the receiving-end control data is encapsulated into data frames according to a preset protocol.

Exemplary, the receiving-end control data is encapsulated into a data frame according to the preset framing protocol. For example, the format of the data frame is: a header of several bytes, followed by the receiving-end control data, and check data.

At S248, the data frames are packed into receiving-end UDP data packets.

At S249, the receiving-end UDP data packets are transmitted to the second 10-gigabit network module according to the UDP protocol.

Since the receiving-end UDP data packets may be transmitted to the transmitting device via the second 10-gigabit network module, the transmitting device may acquire the receiving-end UDP data packets from the first 10-gigabit network module.

After unpacking the UDP data packets, the transmitting device acquires the receiving-end control data according to the preset framing protocol, executes, according to the receiving-end control data, corresponding functions, such as startup, shutdown, adjusting the playing content and the like.

In some implementations, the receiving device unpacks UDP data packets to obtain the transmitting-end control data, the receiving device may transmit, via a communication module connected with a second control device, the transmitting-end control data to the second control device such as computers and the like.

Figure 8:
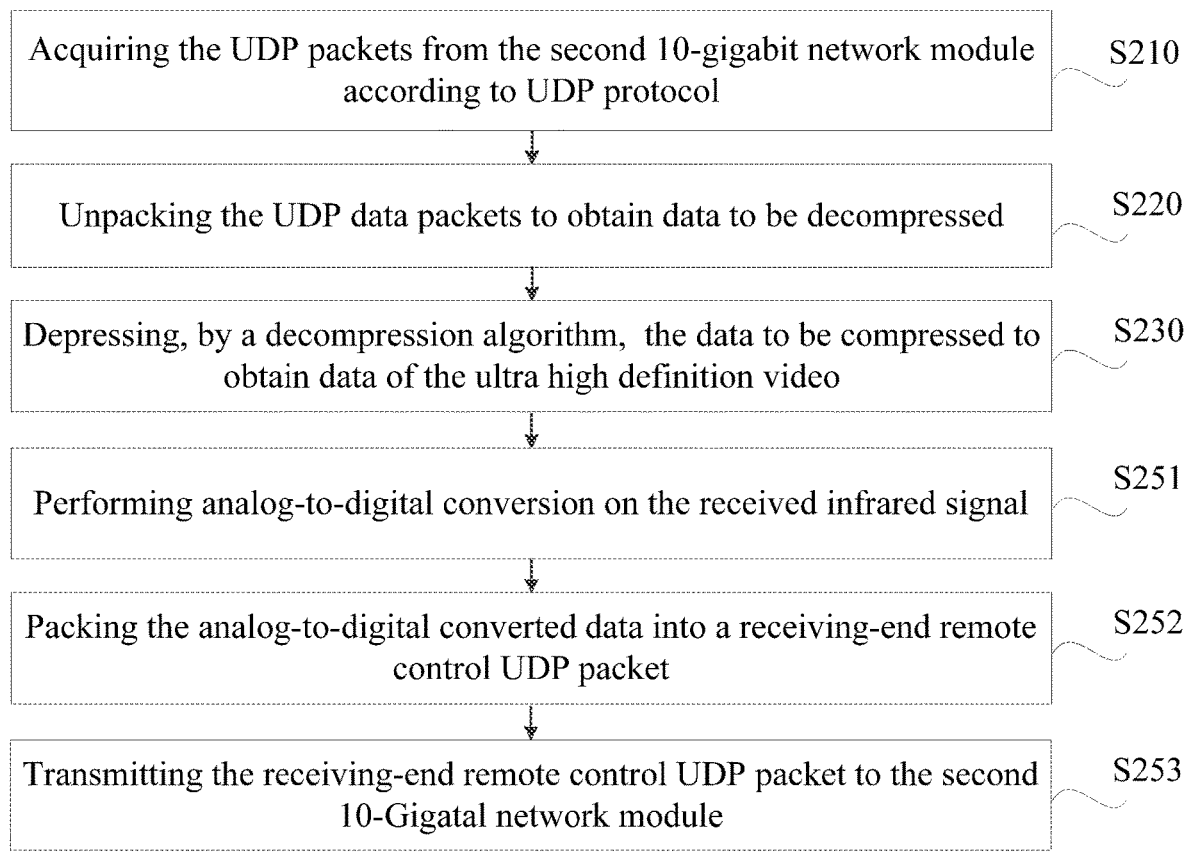
FIG. 8 is a flow chart illustrating a method of receiving ultra high definition video according to other implementation of the present disclosure.

In some implementations, as shown in FIG. 8, the method of receiving the ultra high definition video method further includes the following.

At S251, analog-to-digital conversion is performed on the received infrared signal.

In some implementations, the receiving device receives, the receiving-end infrared receiving tubes, infrared signal transmitted by an external remote controller, and performs, an analog-to-digital converted module, analog-to-digital conversion on the infrared signal to achieve a full sampling of the infrared signal.

At S252, the analog-to-digital converted data is packed into a receiving-end remote control UDP packet.

Exemplary, all analog-to-digital converted data is packed into the receiving-end remote control UDP packet without demodulation and decoding.

At S253, the receiving-end remote control UDP packet is transmitted to the second 10-gigabit network module.

In some implementations, the port number of the UDP data packets in S210 is different from the port number of the receiving-end remote control UDP packet in S253. Thus, the receiving-end remote control UDP packet and the UDP data packet are transmitted independently according to the different port numbers, so that the receiving-end remote control UDP packet can be transmitted to the transmitting device via the second 10-gigabit network module much timely.

Exemplary, an external remote controller transmits, the receiving-end infrared receiving tube, infrared signal to the receiving device, after the infrared signal being transmitted to the transmitting device, the transmitting device obtains, through the digital-to-analog conversion, the infrared signal and transmits, the transmitting-end infrared emission tube, the infrared signal to video source devices such as set-top boxes, computer hosts, DVDs, etc., so as to remotely control, at a side of the transmitting device, the video source devices connected with the transmitting device, such as switching transmission of video and the like.

Figure 9:
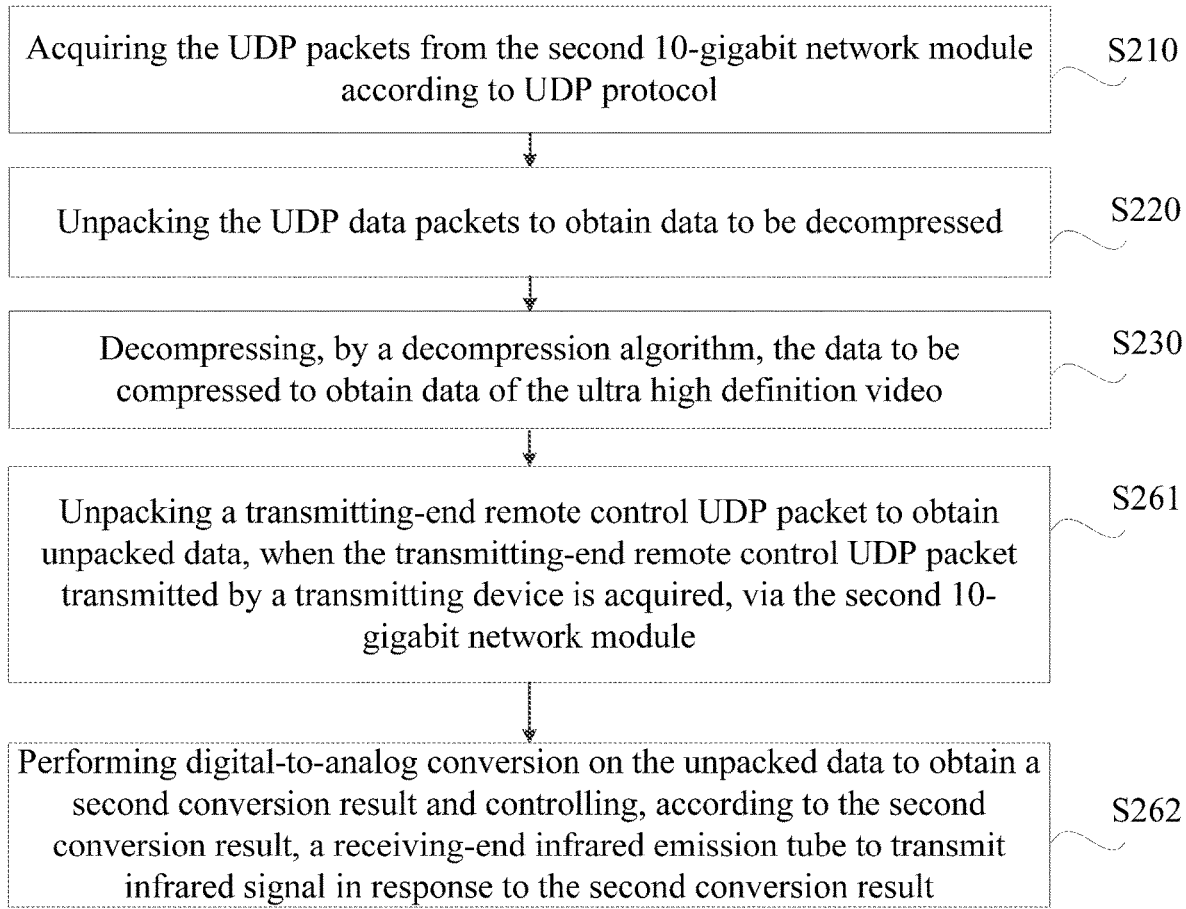
FIG. 9 is a flow chart illustrating a method illustrating receiving ultra high definition video according to other implementation of the present disclosure.

In some implementations, as shown in FIG. 9, the method of receiving the ultra high definition video further includes the following.

At S261, if a transmitting-end remote control UDP packet transmitted by a transmitting device is acquired, via the second 10-gigabit network module, the transmitting-end remote control UDP packet is unpacked to obtain unpacked data.

In the present implementation, the transmitting device receives, via transmitting-end infrared receiving tube, infrared signal transmitted by an external remote controller, and performs analog-to-digital conversion on the infrared signal. Then the full sampled infrared signal is packed into a transmitting-end remote control UDP packet which is transmitted to the second 10-gigatal network module of the receiving device.

If the receiving device acquires the transmitting-end remote control UDP packets transmitted by the transmitting device via the second 10-gigatal network module, the receiving device unpacks the transmitting-end remote control UDP packets.

At S262, digital-to-analog conversion is performed on the unpacked data to obtain a second conversion result and the receiving-end infrared emission tube is controlled to transmit infrared signal according to the second converted result.

Exemplary, the external remote controller transmits, via the transmitting-end infrared receiving tube, infrared signal to the transmitting device. After the infrared signal is transmitted to the receiving device, the receiving device obtains the infrared signal through digital-to-analog conversion module and the receiving-end infrared emitters and transmits the infrared signal to video source device such as set-top boxes, computer hosts, DVD etc., so as to remotely control, at a side of the transmitting device, the display connected with the receiving device, such as adjusting display brightness, saturation, etc.

In some implementations, the port number of the UDP data packet at S210 is different from that of the transmitting-end remote control UDP packets at S261.

Figure 10:
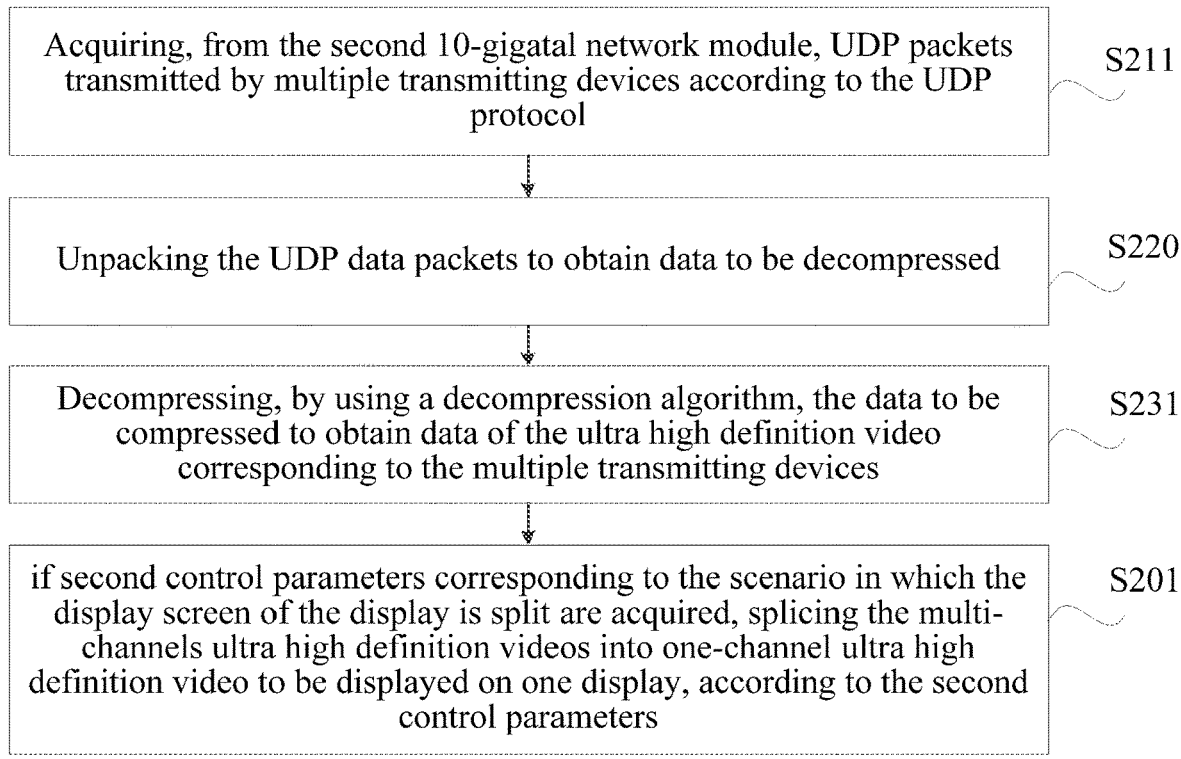
FIG. 10 is a flow chart illustrating a method of receiving ultra high definition video according to other implementation of the present disclosure.

In a scenario in which a display screen of the display is split, the display displays multi-channel ultra high definition videos. For example, four-channel ultra high definition videos transmitted by four transmitting devices are respectively displayed on the upper left region, lower left region, upper right region, and lower right region of the display. As shown in FIG. 10, the operations corresponding to S210 includes the following.

At S211, UDP data packets transmitted by multiple transmitting devices are acquired from the second 10-gigatal network module, according to the UDP protocol.

In the implementations, four transmitting devices are connected with one receiving device through a 10-gigabit switch. The receiving device obtains UDP data packets transmitted by the four transmitting devices according to the UDP protocol and then unpacks the UDP data packets to obtain corresponding data to be decompressed. Operations corresponding to S230 includes the following.

At S231, the data to be compressed is decompressed by using a decompression algorithm, to obtain the multiple ultra high definition videos corresponding to the multiple transmitting devices that are in one-to-one correspondence with the multiple ultra high definition videos.

In the implementation, after all the data to be decompressed are decompressed via the decompression algorithm, four-channel ultra high definition videos transmitted by four transmitting devices are respectively displayed on the upper left region, lower left region, upper right region, and lower right region of the display.

In some implementations, the receiving device may select any ultra high definition video for display.

In some implementations, after performing operations corresponding to S231, the following can be further performed.

At S201, if second control parameters corresponding to the scenario in which the display screen of the display is split are acquired, the multi-channel ultra high definition videos are spliced into one channel ultra high definition video to be displayed on one display, according to the second control parameters.

In some implementations, when the method of receiving ultra high definition video is applicable to a scenario in which the display region of the device is split, the second control parameters corresponding to the scenario in which the display region of the device is split is transmitted, through a control device, by a user, such that the multi-channel ultra high definition videos are spliced into one-channel ultra high definition video according to the second control parameters. As one example, four-channel videos with resolution of 1080P can be merged into one ultra high definition video with resolution of 4 K. For example, four-channel videos are merged on an upper left region, a lower left region, an upper right region, and a lower right region to be transmitted to the display for display, such that it possible to view simultaneously, on one display, ultra high definition videos transmitted by four transmitting devices.

Figure 11:
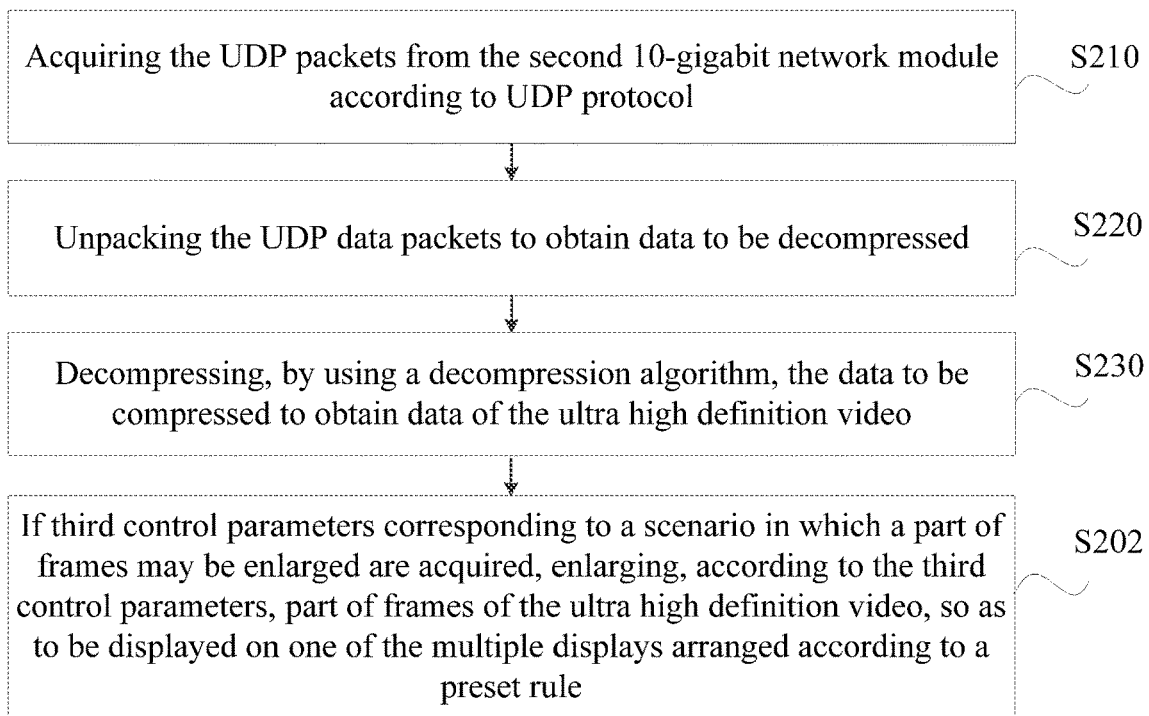
FIG. 11 is a flow chart illustrating a method of receiving ultra high definition video according to other implementation of the present disclosure.

In some implementations, as shown in FIG. 11, after performing operations corresponding to S230, the following may be further performed.

At S202, if third control parameters corresponding to a scenario in which a part of display picture may be enlarged are acquired, part of the frame of the ultra high definition video is enlarged according to the third control parameters, to be displayed on one of the multiple displays arranged according to a preset rule.

In the present implementation, enlarged display scenation refers to the following: multiple displays are arranged in a preset rule, for example, four displays are in a matrix arrangement, each of the multiple displays is connected with a receiving device correspondingly. Each of the receiving device receives the same ultra high definition video transmitted by the same transmitting device, and enlarges segment part of the ultra high definition video to be transmitted to a display corresponding to the receiving device so that the multiple displays are arranged in a preset rule can display the ultra high definition video as a whole. Exemplary, four receiving devices may respectively obtain segments of the upper left region, lower left region, upper right region, and lower right region corresponding to the ultra high definition video, which are respectively transmitted to the four displays arranged in a matrix array.

Exemplary, the receiving device acquires the ultra high definition video transmitted by the transmitting device, where the resolution of the ultra high definition video is 4K. and the ultra high definition is split to obtain a segment, where the resolution of the segment is 1080P, and then the segment is amplified to obtain a partial ultra high definition video with a resolution of 4K. Four displays arranged in the matrix array can display 8K ultra-high-definition video, for example, large screen displays, such as video walls may be achieved.

The method described in the foregoing implementations is applicable to a wide variety of general purpose or special purpose computing system environments or configuration such as: personal computers, server computers, handheld or portable devices, tablet devices, multiprocessor systems, microprocessor based systems, set top boxes, programmable consumer electronics devices, network PCs, small computers, mainframe computers, distributed computing environment including any of the above mentioned system or device, etc.

Figure 12A:
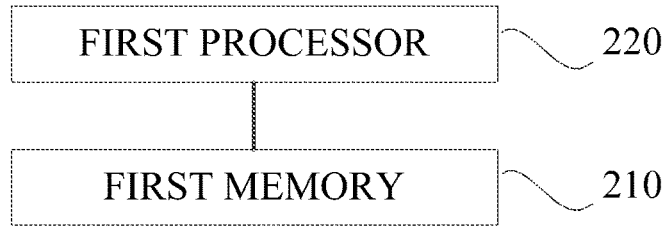
FIG. 12A illustrates a device of transmitting ultra high definition video according to the present disclosure.

As shown in FIG. 12A, a device 100 of transmitting ultra high definition video is provided. The device 100 includes a first memory 210 configured to store program instructions and a first processor 220. The program instructions, when executed by the first processor 220, cause the first processor 220 to implement operations corresponding to the above-mentioned method of transmitting ultra high definition video.

Figure 12B:
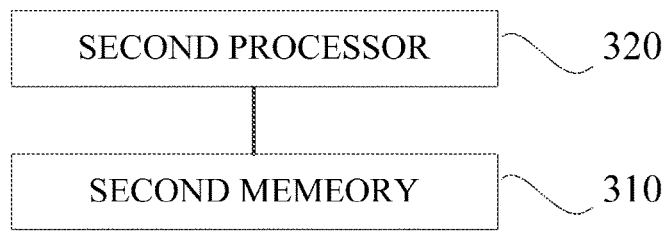
FIG. 12B illustrates a device of receiving ultra high definition video according to the present disclosure.

As shown in FIG. 12B, a device 200 of receiving ultra high definition video is provided. The device 200 includes a second memory 310 configured to store program instructions and a second processor 320. The program instructions, when executed by the second processor 320, cause the second processor 320 to implement operations corresponding to the above-mentioned method of receiving ultra high definition video.

Figure 13:
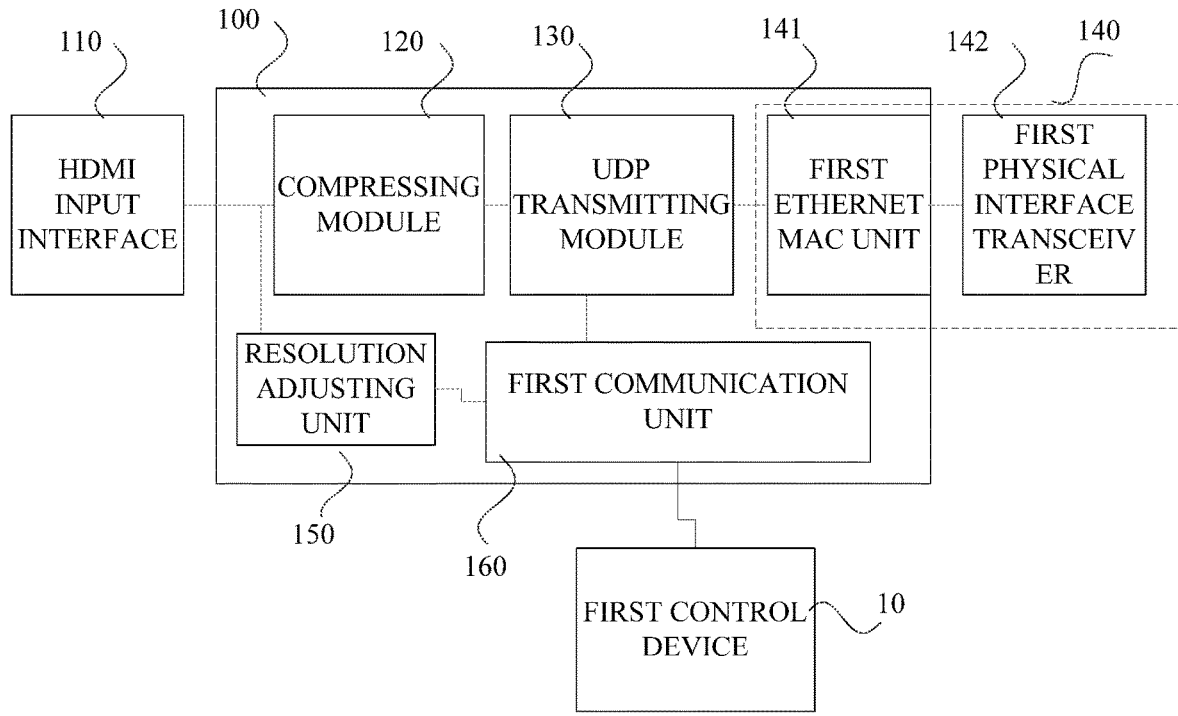
FIG. 13 illustrates a device of transmitting ultra high definition video according to the present disclosure.

Referring to FIG. 13, a device 100 of transmitting ultra high definition video is provided. The device 100 includes an HDMI input interface 110, a compressing module 120, a UDP transmitting module 130, and a first 10-gigabit network module 140. The HDMI input interface 110 is configured to acquire ultra high definition video. The compressing module 120 is connected with the HDMI input interface 110 and configured to compress data in the ultra high definition video. The UDP transmitting module 130 is connected with the compressing module 120 and configured to pack the compressed data into UDP data packets. The first 10-gigabit network module 140 is connected with the UDP transmitting module 130 and configured to transmit the UDP data packets.

In some implementations, the HDMI input interface 110 is configured to be connected with a video source device such as a set top box, a host computer, or a DVD and so on. Exemplary, the obtained ultra high definition video has the following features: a resolution of 4 K, a frame rate of 60 FPS, a YUV coding scheme of 4:4:4, 8-bit depth RGB mode or High Dynamic Range Imaging (HDR).

After the HDMI input interface 110 acquires the ultra high definition video from the video source device, the compressing module 120 is configured to compress data in the ultra high definition video by using a compression algorithm.

In some implementations, the compressing module 120 is configured to compress data in the ultra high definition video via the DSC compression algorithm. In other implementations, the compressing module 120 is configured to compress the data of the ultra high definition video by using VLC compression algorithm to achieve compression of zero latency.

The UDP transmitting module 130 is configured to pack the compressed data into UDP data packets. The UDP is an abbreviation for User Datagram Protocol which refers to OSI reference model. The UDP provides a transaction oriented simple unreliable information delivery service. IETF RFC 768 is the formal specification of UDP. Similar to TCP, the UDP is directly located on the top layer of IP. According to the OSI reference model, both UDP and TCP belong to a transport layer protocol. UDP protocol is mainly used to compress the network data traffic into data packets. One typical data packet is in the form of a transmission unit of the binary data. The first 8 bytes of each data packet represent a header information, and the remaining bytes represent transmission data.

In some implementations, the data of the ultra high definition video which has been subjected to lossless compression may be processed and transmitted over the network according to the high efficient UDP protocol stack.

In some implementations, the high efficient UDP protocol stack is implemented on FPGA by using a hardware description language, and a height of the 64 bit width used in the protocol stack is parallelly, such that latency of the protocol stack processing may be greatly reduced and UDP protocol processing can only be realized in the microsecond level.

In some implementations, the length of the UDP data packet which is obtained by packing the compressed data is larger than 1500 bytes. The UDP protocol processing may overcome the length limit of 1500 bytes of a conventional single frame, can support efficient Ethernet protocol and support jumbo frame protocol of the maximize length of 9000 bytes.

The first 10-gigabit network module 140 is configured to transmit the UDP data packets to the device connected with the first 10-gigabit network module 140 according to the UDP protocol. Exemplary, the first 10-gigabit network module 140 is in connected with the receiving device 200 or the 10-gigabit switch 40, and the first 10-gigabit network module is configured to transmit the UDP data packet to the receiving device 200 or the 10-gigabit switch 40.

In some implementations, the maximum transmission unit of the first 10-gigabit network module 140 is larger than 1500 bytes.

The MTU refers to a size of the maximum data packets passing through a specific layer of a certain of a communication protocol. Typically the parameter of MTU is related to the communication interface, such as network interface cards, serial ports etc. The MTU of the first 10-gigabit network module is set to be larger than 1500 bytes such that the first 10-gigabit network module can match the jumbo frame protocol, the number of data packets in the network may be reduced, and additional cost of processing the header of the data packets is reduced. Via testing, in a conventional Gigabit Ethernet network, there are approximately 81000 data packets passing through the network per second, whereas in the network of the jumbo frame being used, the number of the data packets passing through the network per second is reduced to 14000. In the 10-gigabit networks, the number of the data packets passing through the network per second may be sharply reduced. A frame with a frame length of standard 1518 in a standard network has 812000 data packets passing through the network per second, while in a network using the jumbo frame technology there are only 14000 data packets passing through the network per second, which greatly reduces the number of the frames and improves the performance significantly, such that the actual effective transmission data bandwidth of the network module of the first 10-gigabit network module can reach 8.7 Gbps, such that the variable length coding of the ultra high definition video can be transmitted, via a low-cost 10-gigabit network, with the Lossless Data Compression of zero delay, standard industry requirement can be achieved.

In some implementations, as shown in FIG. 13, the transmitting device 100 of the ultra high definition video further includes a first communication unit 160 connected with the first control device 10. Exemplary, the first communication unit 160 includes a network control interface, which can be connected, through a TCP/IP protocol, with the first control device 10 such as a computer. Alternatively, the first communication unit 160 includes a USB interface or an RS232 interface which can be connected with the first control device 10 such as a mouse, a keyboard etc. The transmitting-end control data transmitted by the first control device 10 such as a computer, a mouse, a keyboard and the like can be transmitted, through the first communication unit 160, to the transmitting device 100. Thus, the transmitting device 100 can acquire the transmitting-end control data.

The first communication unit 160 is configured to connected with the UDP transmitting module 130. The UDP transmitting module 130 is further configured to acquire the transmitting-end control data by using the first communication unit 160, and packs the compressed data and the transmitting-end control data into UDP data packets.

In some implementations, the UDP transmitting module 130 is configured to pack both the data frames obtained by encapsulating the compressed data and the receiving-end control data into multiple UDP data packets, each of which has a length larger than 1500 bytes. Such that the UDP data packet can be transmitted to the receiving device 200 through the first 10-gigabit network module 140, whereby the receiving device 200 can obtain the transmitting-end control data according to the UDP data packets, and can perform, according to the transmitting-end control data, corresponding control functions, such as turning on, turning off, adjusting of playing resolution, playing window, and the like.

In some other implementations, the receiving device 200 may also transmit receiving-end UDP data packets including the receiving-end control data to the transmitting device 100. Therefore, the transmitting device 100 can acquire the receiving-end UDP data packets from the first 10-gigabit network module 140. The UDP transmitting module 130 of the transmitting device 100 is configured to obtain the receiving-end control data after the UDP transmitting module 130 configured to unpack the receiving-end UDP data packet. Therefore, the transmitting device 100 can be configured to perform corresponding functions according to the receiving-end control data, such as turning on, turning off, adjusting the playing content, and the like.

In some implementations, after the transmitting device 100 is configured to unpack the receiving-end UDP data packet to obtain a receiving-end control data, the receiving-end control data may be transmitted, through the first communication unit 160, to the first control device 10 such as a computer, where the first communication unit 160 is connected with the first control device 10.

In some implementations, as shown in FIG. 13, the transmitting device 100 further includes a resolution adjusting unit 150 configured to adjust the resolution of the ultra high definition video acquired by the HDMI input interface 110, where the resolution adjusting unit 150 is connected between the HDMI input interface 110 and the compressing module 120.

In some implementations, the first communication unit 160 is further configured to connected with the resolution adjusting unit 150. If the resolution adjusting unit 150 acquires a trigger electrical signal from the first control device 10 through the first communication unit 160, such that the resolution adjusting unit 150 adjusts, according to the trigger electrical signal, the resolution of the ultra high definition video acquired by the HDMI input interface 110.

In some implementations, the first communication unit 160 includes 100M network control interfaces which can be connected, through a TCP/IP protocol, with the first control device 10 such as a computer. The trigger electrical signal can be transmitted, Through the control software on the computer, to the resolution adjusting unit 150, such that the resolution adjusting unit 150 is configured to adjust, in response to the trigger electrical signal, the ultra high definition video resolution acquired by the HDMI input interface 110 to zoom in or zoom out the ultra high definition video.

In some implementations, the first communication unit 160 includes a DIP switch detection circuit, which can be connected with a DIP switch. The trigger signal can also be transmitted, by dialing the DIP switch, to the resolution adjusting unit 150, such that the resolution adjusting unit 150 is configured to adjust, in response to the trigger electrical signal, the resolution of the ultra high definition video acquired by the HDMI input interface 110 to zoom in or zoom out the ultra high definition video.

In some implementations, if the resolution adjusting unit 150 acquires, through the first communication unit 160, the first control parameter corresponding to a scenario in which a display screen of the display is split from the first control device 10, such that the resolution adjusting unit 150 is figured to adjust the resolution of the ultra high definition video according to the first control parameter.

In the present implementation, a scenario in which a display screen of the display is split refers to the display 50 displaying multi-channel ultra high definition videos such as four-channel ultra high definition videos transmitted by four transmitting devices being respectively displayed in the upper left area, the lower left region, the upper right region, and the lower right region of the display 50.

In some implementations, when the transmitting device 100 of receiving ultra high definition video is applicable to a scenario in which the display region of the transmitting device 100 is split. If the resolution of the ultra high definition video acquired by the transmitting device 100 is 4K and the resolution of a video being played by the display 50 is 4K, the first control parameters corresponding to the scenario in which the display region of the device is split is transmitted, through a control device, by a user, to the transmitting device 100. The transmitting device 100 adjust the ultra high definition video with the resolution of 4K to the video with the resolution of 1080P. The receiving device 200 finally captures four-channel videos with a resolution of 1080P and synthesizes the four-channel videos into the ultra high definition video with the resolution of 4K, for example, the four-channel videos are respectively spliced into a upper left region, a lower left region, an upper right region, and a lower right area, which are transmitted to the display 50 for display, thereby making it possible to view simultaneously, on the display 50, the ultra high definition videos transmitted by four transmitting devices 100.

Exemplary, in a scenario in which a display screen of the display is split of four transmitting devices 100 corresponding to one receiving device 200, the first control parameter corresponding to the scenario in which a display screen of the display is split is transmitted, through the first control device 10 be used by a user, the resolution adjusting unit 150 adjust the ultra high definition video with resolution of 4 K acquired to a video with resolution of 1080P according to the first control parameter. The receiving device 200 finally captures four-channel videos with a resolution of 1080P and synthesizes the four-channel videos into the ultra high definition video with the resolution of 4K, for example, the four-channel videos are spliced into a upper left region, a bottom-left, an upper right region and a bottom right area, respectively, and are transmitted to the display 50 for displaying, thereby making it possible to view simultaneously, on the display 50, the ultra high definition videos transmitted by four transmitting devices 100.

In some implementations, in a scenario in which a display screen of the display is split of one transmitting devices 100 corresponding to one receiving device 200, the bypass control parameter corresponding to the scenario in which a display screen of the display is split is transmitted, through the first control device 10, to the transmitting device 100, the Source image resolution transmission need not being zoom in or zoom out, and the resolution adjusting unit 15 four0 does not work.

In some implementations, the compressing module 120, the UDP transmitting module 130 and the resolution adjusting unit 150 are integrated into Field Programmable Gate Array, i.e., a FPGA.

In the present implementation, the high efficient UDP protocol stack is implemented on FPGA by using a hardware description language, and a height of the 64 bit width used in the protocol stack is parallelly, such that latency of the protocol stack processing may be greatly reduced and UDP protocol processing can only be realized in the microsecond level.

In some implementations, the first 10-gigabit network module 140 includes a first Ethernet MAC unit 141, and a first physical interface transceiver 142 connected with the first Ethernet MAC unit 141, i.e., the first 10-gigabit Ethernet PHY. Exemplary, the first Ethernet MAC unit 141 can also be integrated into the FPGA.

Figure 14:
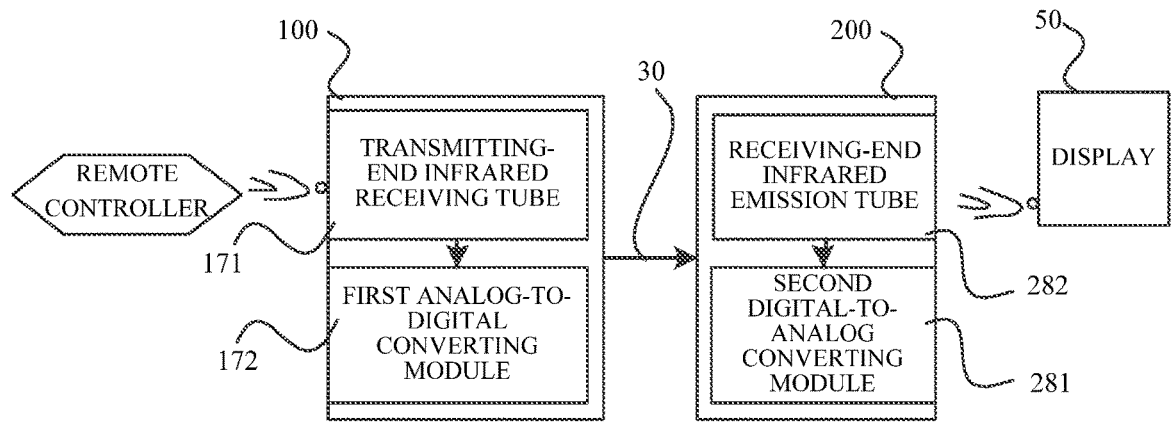
FIG. 14 is a block diagram illustrating a first exemplary implementation of the device of transmitting ultra high definition video and the device of receiving ultra high definition video according to the present disclosure.

In some implementations, as shown in FIG. 14, the transmitting device 100 further includes a receiving-end infrared receiving tube 171 and a first analog-to-digital converting module 172. The first analog-to-digital converting module 172 is configured to perform analog-to-digital conversion on the infrared signal received by the transmitting-side infrared receiving tube 171. The UDP transmitting module 130 is further configured to pack all the analog-to-digital converted data into a receiving-end remote control UDP packet and transmit the receiving-end remote control UDP packet to the first 10-gigabit network module 140.

Exemplary, the transmitting device 100 receives the infrared signal transmitted by the external remote controller through the receiving-end infrared receiving tube 171, and performs analog-to-digital conversion on the infrared signal received by the receiving-end infrared receiving tube 171 through the analog-to-digital converting module 172 to implement full sampling of the infrared signal. The UDP transmitting module 130 directly packs all the data after the analog-to-digital conversion into the receiving-end remote control UDP and transmits the data to the first 10-gigabit network module 140 without demodulation and decoding.

Exemplary, the transmitting-end remote control UDP packet and the UDP data packet are independent from each other. For example, a port number of the transmitting-end remote control UDP packet is different from that of the UDP packet. Thus, the transmitting-end remote control UDP packet and the UDP data packet are transmitted independently based on the different port numbers, so that the transmitting-end remote control UDP packet can be transmitted to the receiving device via the first 10-gigabit network module much timely.

Exemplary, after an external remote controller transmits an infrared signal to the transmitting-end infrared receiving tube 171 of the transmitting device 100 and the infrared signal is transmitted to the receiving device 200. The receiving device 200 obtains the infrared signal transmitted by the transmitting device 100 through corresponding digital-to-analog conversion and the receiving-end infrared emission tube, and transmits the infrared signal to a device such as a display, so as to achieve, in a side of the transmitting device, remotely controlling the display device connected with the receiving device, such as adjusting display brightness, saturation and the like.

Figure 15:
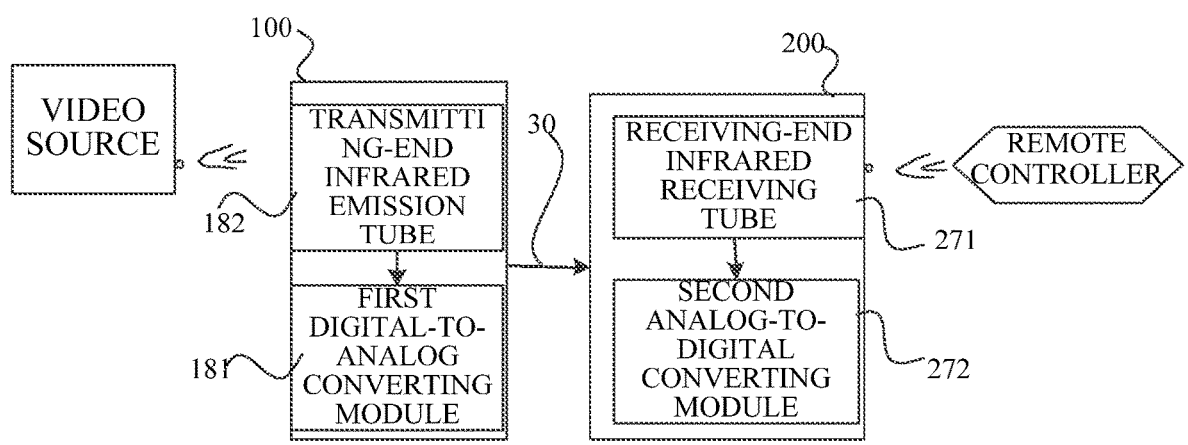
FIG. 15 is a block diagram illustrating a second exemplary implementation of the device of transmitting ultra high definition video and the device of receiving ultra high definition video according to the present disclosure.

In some implementations, as shown in FIG. 15, the transmitting device 100 further includes a first digital-to-analog converting module 181 and a receiving-end infrared emission tube 182. The UDP transmitting module 130 is further configured to acquire, by the first 10-gigabit network module 140, the receiving-end remote control UDP packet transmitted by the receiving device 200, and unpack the receiving-end remote control UDP packet. The first digital-to-analog converting module 181 is configured to perform digital-to-analog conversion on the unpacked data and control the receiving-end infrared emission tube 182 to transmit an infrared signal according to the result of the digital-to-analog conversion.

Exemplary, after the infrared signal transmitted by the external remote controller to the receiving device 200 is transmitted to the transmitting device 100, the transmitting device 100 obtains the infrared signal through the digital-to-analog conversion and the transmitting-side infrared emission tube, and transmits the infrared signal to the video source such as a set-top box, a host computer, or a DVD to realize, in a side of the receiving device, remotely controlling the video source connected with the transmitting device 100 on the receiving device 200 side to implement tasks such as switching the transmitted video.

Exemplary, the port number of the UDP data packets is different from that of the transmitting-end remote control UDP packets.

Figure 16:
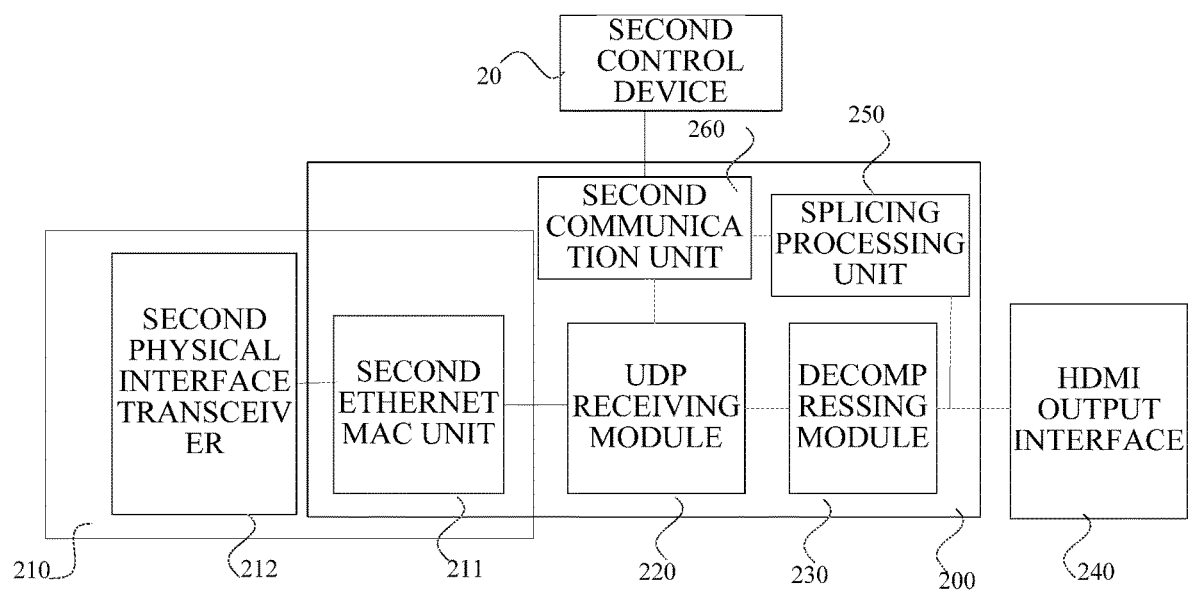
FIG. 16 is a block diagram illustrating the device of receiving ultra high definition video according to the present disclosure.

The ultra high definition video of the receiving device 200 as shown in FIG. 16. The receiving device 200 includes a second 10-gigabit network module 210, a UDP receiving module 220 for acquiring a UDP data packet from the second 10-gigabit network module 210 according to the UDP protocol, and unpacking the data to be decompressed from the UDP data packet, a decompressing module 230 for decompressing the decompressed data to obtain data in the ultra high definition video, and an HDMI output interface 240 for outputting the ultra high definition video. The second 10-gigabit network module 210, the UDP receiving module 220, the decompressing module 230 and the HDMI output interface 240 are sequentially connected.

In the present implementation, the receiving device 200 receives the UDP data packets through the 10-Gigabit network. Exemplary, the second 10-gigabit network module 210 is communicatively connected with the transmitting device 100 or communicatively connected with the 10-gigabit switch 40.

The UDP receiving module 220 is configured to acquire a UDP data packet from the transmitting device 100 through the second 10-gigabit network module 210, or acquire a UDP data packet transmitted by the transmitting device 100 from the 10-gigabit switch 40. In some implementations, the length of the UDP packet is larger than 1500 bytes, and the maximum transmission unit of the second 10-gigabit network module 210 is larger than 1500 bytes.

After receiving the UDP data packets according to the efficient UDP protocol stack, the UDP receiving module 220 unpacks the UDP data packets to obtain the data to be decompressed. In some implementations, the efficient UDP protocol stack is implemented on the FPGA by using the hardware description language, and a height of the 64 bit width used in the protocol stack is parallelly, such that latency of the protocol stack processing may be greatly reduced and UDP protocol processing can only be realized in the microsecond level.

The decompressing module 230 is configured to decompress the data to be decompressed to obtain the data in the ultra high definition video. In some implementations, the data of the ultra high definition video is decompressed by a Display Stream Decompression (DSD) decompression algorithm. In some other implementations, the data is decompressed by a visually lossless decompression algorithm such as Visual Lossless Decompression (VLD) compression algorithm to implement zero-delay decompression.

In some implementations, after decompressing the data to be decompressed by the decompression algorithm to obtain the data in the ultra high definition video, the HDMI output interface 240 outputs the ultra high definition video, for example, the HDMI2.0 interface transmits the ultra high definition video to the display for displaying.

In some implementations, the receiving device 200 of the ultra high definition video further includes a second communication unit 260 for connecting with the second control device 20, and the second communication unit 260 is connected with the UDP receiving module 220.

Exemplary, the second communication unit 260 includes network control interface, USB interface, or RS232 interface, and can be connected with a second control device 20 such as a computer, a mouse, a keyboard, etc. Through the second control device 20, the receiving-end control data can be acquired.

The UDP receiving module 220 is further configured to acquire the receiving-end control data by using the second communication unit 260, and pack the receiving-end control data into the receiving-end UDP data packets and transmit the receiving-end UDP data packets to the second 10-gigabit network module 210. Therefore, the receiving device 200 can transmit the receiving-end UDP data packets including the receiving-end control data to the transmitting device 100 through the second 10-gigabit network module 210, and the transmitting device 100 can acquire the receiving-end UDP data packets from the first 10-gigabit network module 140.

The transmitting device 100 is configured to obtain the receiving-end control data according to the preset framing protocol after unpacking the UDP data packet, and performs corresponding functions according to the receiving-end control data, such as power on, power off, adjusting the playing content, and the like.

In some implementations, the transmitting device 100 is configured to acquire the transmitting-end control data transmitted by the first control device 10 such as a computer through the first communication unit 160, encapsulate the compressed video data and the receiving-end control data into data frames, pack the data frames into UDP data packets, and transmit the UDP data packs to the receiving device 200. The receiving device 200 unpacks the UDP data packets to obtain receiving-end control data. The receiving device 200 performs corresponding control functions according to the receiving-end control data, such as power on, power off, adjusting playing resolution or playing window, and the like.

In some implementations, the receiving device 200 is configured to unpack the UDP data packet transmitted by the transmitting device 100 to obtain the receiving-end control data, and may transmit the receiving-end control data to the second control device 20 such as a computer via the second communication unit 260.

In some implementations, as shown in FIG. 16, the receiving device 200 further includes a splicing processing unit 250 configured to splice the multi-channel ultra high definition videos into one channel of video data, and the splicing processing unit 250 is connected between the decompressing module 230 and the HDMI output interface 240.

In some implementations, as shown in FIG. 16, the second communication unit 260 is also connected with the splicing processing unit 250. The splicing processing unit 250 is configured to acquire the trigger electrical signal from the second control device 20 through the second communication unit 260, where the multi-channel ultra high definition videos are spliced into one channel of video.

In some implementations, if the splicing processing unit 250 is configured to acquire the second control parameter corresponding to the scenario in which the display screen of the display is split transmitted by the second control device 20 through the second communication unit 260, the multi-channel ultra high definition videos are spliced, according to the second control parameter, into one channel video which is displayed on one display 50.

Exemplary, when the receiving device 200 is applicable to a scenario in which the display region of the device is split, the second control parameter corresponding to the scenario in which a display screen of the display is split is input.

the splicing processing unit 250 is configured to splice multi-channel ultra high definition video into one channel of video data such that the splicing processing unit 250 configured to synthesize the four-channel videos with the resolution of 1080P into one-channel ultra high definition video with the resolution of 4K. For example, the four-channel videos are spliced into a upper left region, a bottom-left, an upper right region and a bottom right area, respectively, and are transmitted to the display 50 for displaying, thereby making it possible to view simultaneously, on the display 50, the ultra high definition videos transmitted by four transmitting devices.

In some implementations, the receiving device 200 further includes a segment processing unit (not shown) for amplifying a part frames of the ultra high definition video, and the segment processing unit is connected between the decompressing module 230 and the HDMI output interface 240.

In some implementations, the second communication unit 260 is connected with the segment processing unit. The segment processing unit is configured to acquire the trigger electrical signal from the second control device 20 through the second communication unit 260, the triggering electrical signal for triggering of amplifying the part of frames of the ultra high definition video is enlarged to be displayed on one of the multiple displays 50 arranged in a preset rule.

Exemplary, if the segment processing unit acquires a third control parameter corresponding to the scenario in which a part frames may be enlarged, the part of frames of the ultra high definition video is enlarged according to the third control parameter so as to be displayed in one of the multiple displays 50 arranged according to a preset rule.

In the present implementation, the enlarged display scenario refers to that the multiple display 50 are arranged according to a preset rule, for example, four displays 50 are in a matrix arrangement, each of the multiple display 50 is connected with a corresponding receiving device 200. Each receiving device 200 acquires the same ultra high definition video from the same transmitting device, the part of frames segmented from the ultra high definition video is enlarged and transmitted to the display 50 corresponding to the receiving device 200, and thus the plurality of displays 50 arranged according to a preset rule can completely display the ultra high definition video. Exemplary, the four receiving devices 200 respectively splice the ultra high definition video into an upper left region, a bottom-left region, an upper right region and a bottom right region, and respectively transmit to the four displays 50 arranged by matrix.

Exemplary, a receiving device 200 is configured to acquire the ultra high definition video with a resolution of 4 K, from the transmitting device 100, the ultra high definition video is segmented into part of frames with a resolution of 1080P, where the part of frames with a resolution of 1080P is enlarged into partial ultra high definition video with a resolution of 4 K. The four displays 50 display the ultra high definition video with a resolution of 8K in a matrix arrangement, for example, for displaying on a large display, such as a video wall.

In some implementations, the second communication unit 260 includes a 100M network control interface, and can be connected with the second control device 20 such as a computer according to a TCP/IP protocol. Through the control software in the computer, a trigger electrical signal can be transmitted to the splicing processing unit 250 via the second communication unit 260 to cause the splicing processing unit 250 to splice the multiple-channel ultra high definition video into one-channel video.

In some implementations, the second communication unit 260 includes a DIP switch detection circuit, which can be connected with the DIP switch. The trigger signal can also be transmitted to the splicing processing unit 250 by dialing the DIP switch to cause the splicing processing unit 250 to splice the multiple-channel ultra high definition videos into one channel video.

In some implementations, as shown in FIG. 15, the receiving device 200 further includes a receiving-end infrared receiving tube 271 and a second analog-to-digital converting module 272 configured to perform analog-to-digital conversion on the infrared signal received by the infrared receiving tube 271. Exemplary, the receiving device 200 receives the infrared signal transmitted by the external remote controller through the receiving-end infrared receiving tube 271, and performs analog-to-digital conversion on the infrared signal received by the receiving-end infrared receiving tube 271 through the second analog-to-digital converting module 272 to achieve full sampling of the infrared signal.

The UDP receiving module 220 is further configured to pack all the data after the analog-to-digital conversion into a receiving-end remote control UDP packet, and transmit the receiving-end remote control UDP packet to the second 10-gigabit network module 210.

Exemplary, the infrared signal transmitted by the external remote controller to the receiving-end infrared receiving tube 271 of the receiving device 200 is transmitted to the transmitting device 100, and the transmitting device 100 obtains the infrared signal through digital-to-analog conversion and an infrared emission tube, and transmits the infrared signal to the video source device such as the set top box, the host computer, and the DVD to achieve remotely, on the side of the receiving device 200, controlling the video source device to implement tasks such as switching the transmitted video.

In some implementations, as shown in FIG. 14, the receiving device 200 further includes a second digital-to-analog converting module 281 and a receiving-end infrared emission tube 282. The UDP receiving module 220 is further configured to acquire the receiving-end remote control UDP packet transmitted by the transmitting device 100 via the second 10-gigabit network module 210, and unpack the receiving-end remote control UDP packet to obtain unpacked data. The second digital-to-analog converting module 281 is configured to perform digital-to-analog conversion on the unpacked data, and control the receiving-end infrared emission tube 282 to transmit an infrared signal according to the result of the digital-to-analog conversion.

In the present implementation, the transmitting device 100 may transmit the transmitting-end remote control UDP packet to the second 10-gigabit network module 210 of the receiving device 200. If the receiving device 200 acquires the receiving-end remote control UDP packet transmitted by the transmitting device 100 through the second 10-gigabit network module 210, the receiving device 200 unpacks the receiving-end remote control UDP packet and obtains the infrared signal via the digital-to-analog conversion and receiving-end infrared emission tube 282. The infrared signal is transmitted to a device such as a display to realize a remote control of the device such as a display connected with the remote control receiving device 200 on the side of the transmitting device 100, for example, adjusting displaying brightness, saturation, and the like.

In some implementations, the UDP receiving module 220, the decompressing module 230, and the splicing processing unit 250 are integrated into a field programmable gate array, i.e., a FPGA.

In the implementation, the UDP data packets are received and unpacked according to the efficient UDP protocol stack. The efficient UDP protocol stack is implemented by using the hardware description language on the FPGA, and the delay of the protocol stack processing is greatly reduced by using a 64-bit width parallelly process in the protocol stack, which only needs microsecond second level to implement UDP Protocol processing.

In some implementations, as shown in FIG. 16, the second 10-gigabit network module 210 includes a second Ethernet MAC unit 211 and a second physical interface transceiver 212 connected with the second Ethernet MAC unit 211, i.e., the second 10 Gigabit Ethernet PHY. Exemplary, the second Ethernet MAC unit 211 can also be integrated into a field programmable gate array, i.e., a FPGA.

Figure 17:
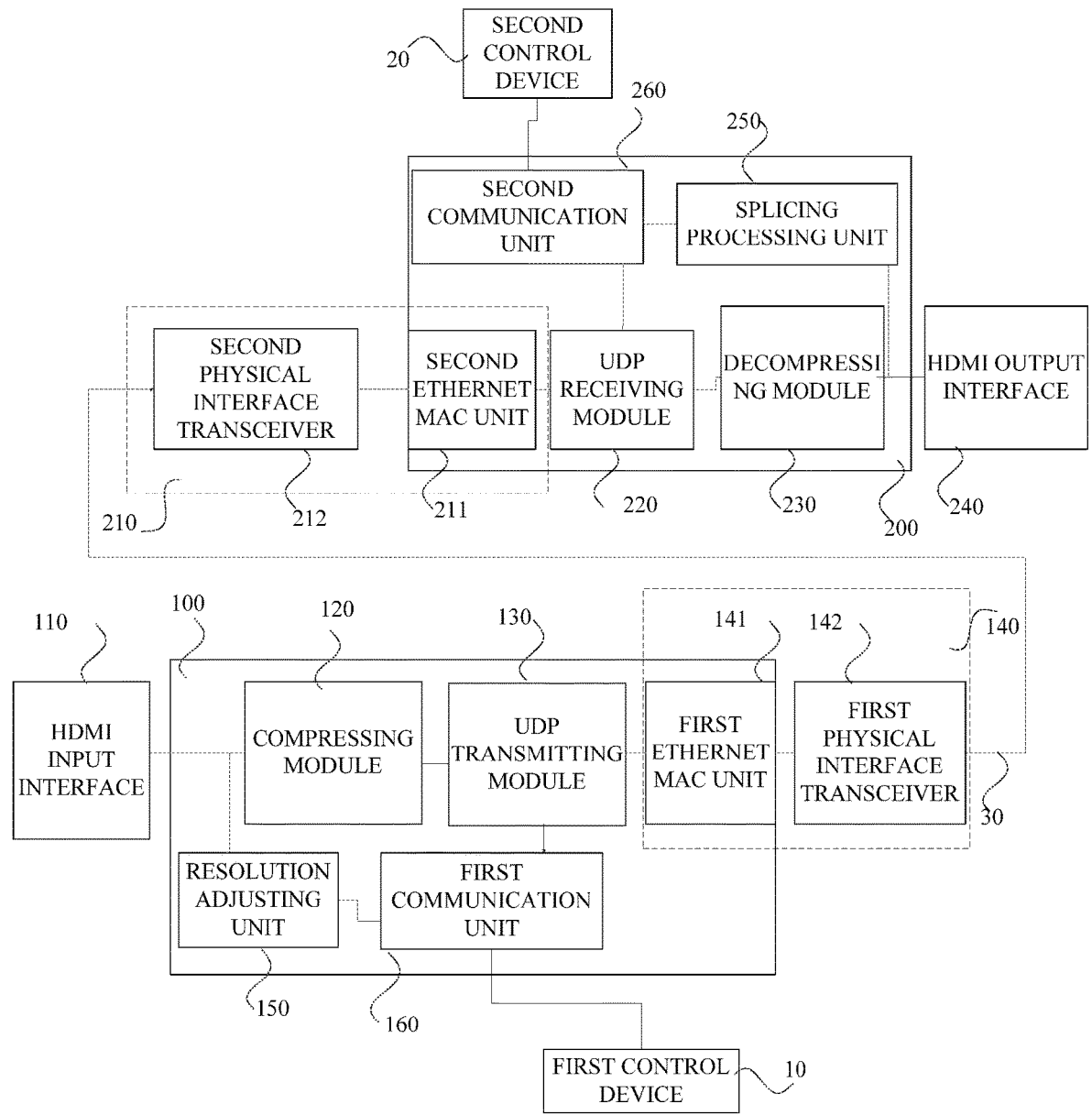
FIG. 17 is a block diagram illustrating a first exemplary implementation of a transmission system.

FIG. 17 illustrates a transmission system of the ultra high definition video. The transmission system of the ultra high definition video includes the transmitting device 100 of ultra high definition video and the receiving device 200 of ultra high definition video as mentioned above.

Figure 18:
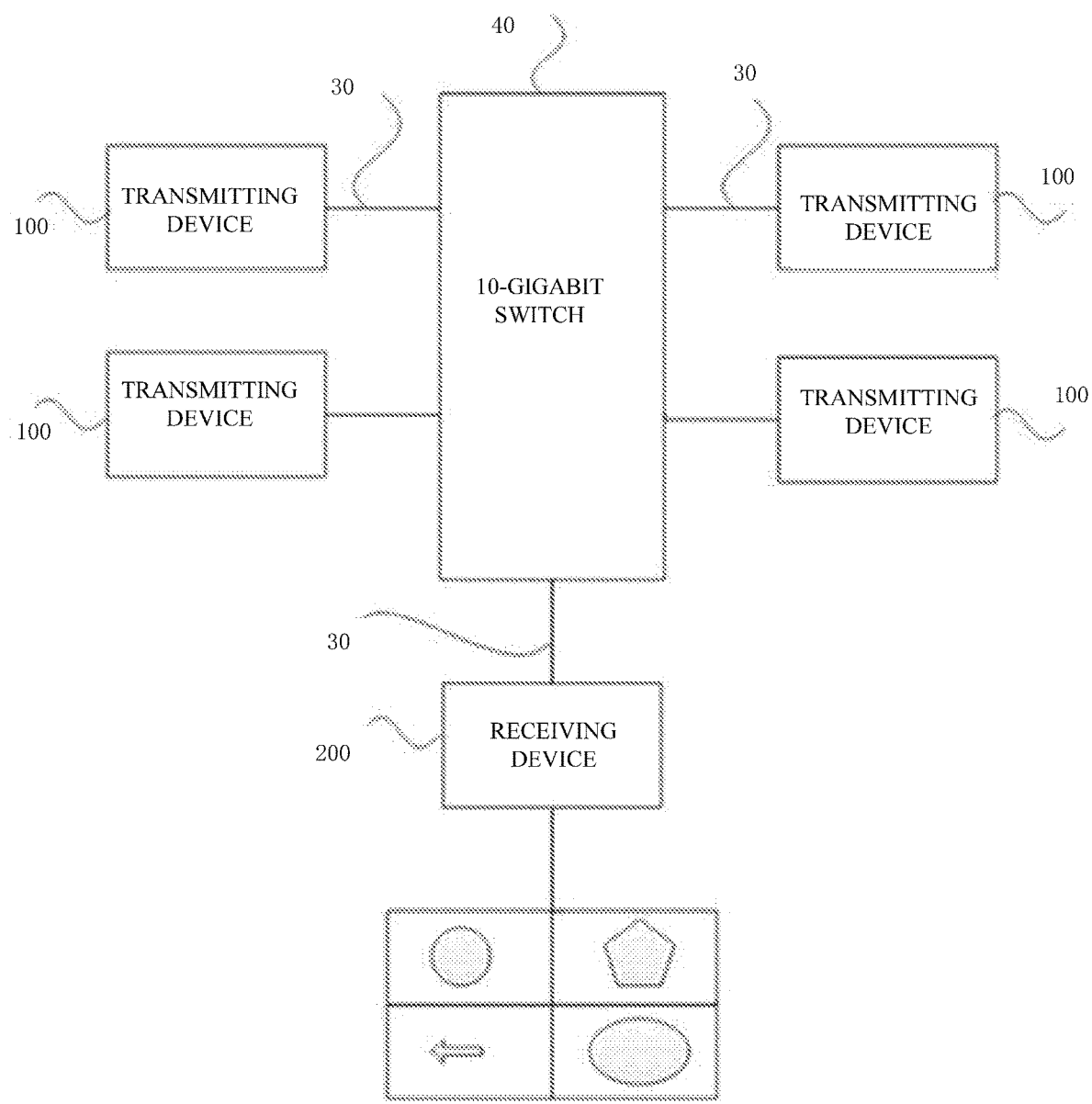
FIG. 18 is a block diagram illustrating a second exemplary implementation of a transmission system.

In some implementations, as shown in FIG. 18, the transmission system further includes a 10-gigabit switch 40.

The transmission system includes multiple transmitting devices 100. Each of the transmitting devices 100 and the receiving device 200 are all connected with the 10-gigabit switch 40 through a network cable 30.

In some implementations, the resolution adjusting unit 150 of the transmitting device 100 is configured to acquire the first control parameter corresponding to the scenario in which a display screen of the display from the first communication unit 160 and adjust the resolution of the ultra high definition video acquired by the HDMI input interface 110.

The UDP receiving module 220 of the receiving device 200 is configured to acquire UDP data packets transmitted by the multiple transmitting devices 100, and the decompressing module 230 is configured to decompress the data to be decompressed to obtain multiple-channel ultra high definition videos that is in one-to-one correspondence with the transmitting devices 100.

The splicing processing unit 250 of the receiving device 200 is figured to acquire the second control parameter corresponding to the segmented display scenario from the second communication unit 260, and splice the multiple-channel ultra high definition video into one-channel video to be displayed on one display 50.

Figure 19:
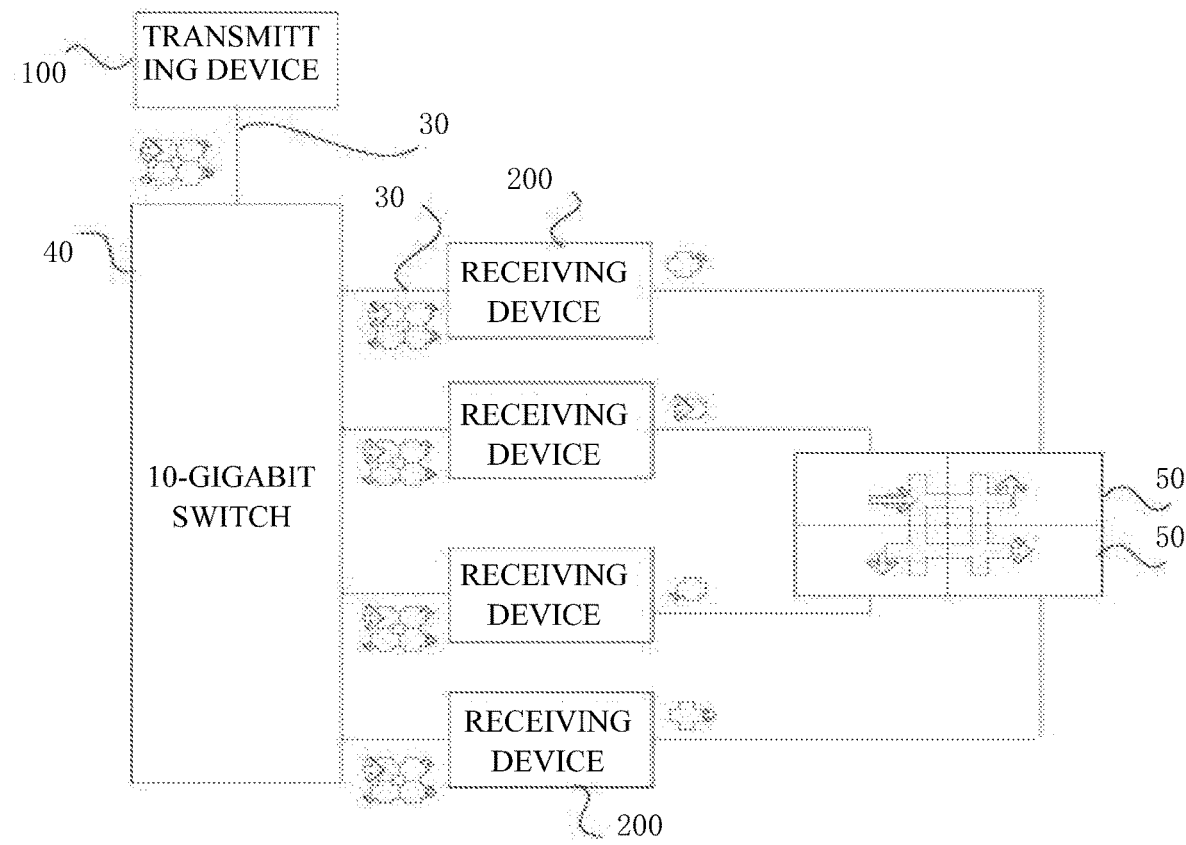
FIG. 19 is a block diagram illustrating a third exemplary implementation of a transmission system.

In some implementations, as shown in FIG. 19, the transmission system further includes a 10-gigabit switch 40, a transmitting device 100, and multiple receiving devices 200. The receiving device 200 and the transmitting device 100 are connected with the 10-gigabit switch 40 via a network cable 30.

In some implementations, the receiving device 200 is configured to acquire, from the second communication unit 260, third control parameters corresponding to enlarged display scenario, and enlarge a part of frames of ultra high definition video according to the third control parameters to be displayed on a display of the multiple displays 50 arranged in a preset rule. Exemplary, videos corresponding to an upper left region, a lower left region, an upper right region, and a lower right region of the ultra high definition video may be respectively segmented by four receiving devices 200 and then are transmitted to four displays 50 arranged by matrix.

In some implementations, control parameters (such as first control parameters corresponding to a scenario in which a display screen of the display is split) which may be obtained by a transmitting device 100 from the first communication unit 160 can be transmitted to another transmitting device 100 and/or the receiving device 200 through the network cable 30 or the 10-Gigabit switch 40. As such, the another transmitting device 100 and/or the receiving device 200 can perform corresponding operations according to control parameters.

In some implementations, control parameters (such as second control parameters corresponding to a scenario in which a display screen of the display is split) which may be obtained by the receiving device 100 from the second communication unit 260 can be transmitted to at least one transmitting device 100 through the network cable 30 or the 10-Gigabit switch 40. As such, the at least one transmitting device 100 can perform corresponding operations according to control parameters.

Exemplary, in a scenario in which a display screen of the display is split of four transmitting devices 100 corresponding to one receiving device 200, the first control parameter is transmitted, through computer being used by a user, to one transmitting device 100, where the control information corresponding to the first control parameter is transmitted to the other three transmitting devices 100 and the receiving device 200, through the network cable 30 and the 10-gigabit switch 40, and then each of the three transmitting devices 100 adjusts the respectively acquired video with a resolution of 4K to a resolution of 1080P according to the corresponding control information. After unpacking to obtain the four-channel videos, the receiving device 200, according to the corresponding control information, captures four-channel videos with a resolution of 1080P respectively and synthesizes the four-channel videos into one channel ultra high definition video with the resolution of 4K, for example, the four-channel videos are respectively spliced on a upper left region, a lower left region, an upper right region, and a lower right region, which are transmitted to the display 50 to display, thereby making it possible to view the ultra high definition videos transmitted by four transmitting devices 100 on the display 50 simultaneously.

Exemplary, in a scenario in which a display screen of the display is split of four transmitting devices 100 corresponding to one receiving device 200, the first control parameter is transmitted, through computer being used by a user, to one receiving device 200, where the control information corresponding to the second control parameter is transmitted to each of the four transmitting devices 100, through the network cable 30 and the 10-gigabit switch 40, and then each of the four transmitting devices 100 adjusts the respectively acquired video with a resolution of 4 K to a resolution of 1080P according to the corresponding control information. After unpacking and restoring to obtain the four-channel videos, the receiving device 200, according to the corresponding control information, captures four-channel videos with a resolution of 1080P respectively and synthesizes the four-channel videos into one channel ultra high definition video with the resolution of 4K, for example, the four-channel videos are respectively spliced into a upper left region, a lower left region, an upper right region, and a lower right region, which are transmitted to the display 50 for display, thereby making it possible to view the ultra high definition videos transmitted by four transmitting devices 100 on the display 50 simultaneously.

According to the method and device of transmitting and receiving ultra high definition video provided in the implementations, a compressed data packet is encapsulated into a UDP data packet, and the UDP data packet is transmitted via a 10-gigabit network module, thereby implementing high efficient video data transmission with a maximum real-time bandwidth can reach 8.7 Gbps based on a 10-gigabit network and a UDP protocol stack.

The above implementations are only the preferred implementations of the present invention, and do not limit the scope of the present invention. A person skilled in the art may make various other corresponding changes and deformations based on the described technical solutions and concepts. And all such changes and deformations shall also fall within the scope of the present invention.

What is claimed is:

1. A method of transmitting ultra high definition video, comprising:
    acquiring ultra high definition video;
    compressing, by a compression algorithm, data of the ultra high definition video to obtain compressed data;
    packing the compressed data into user datagram protocol (UDP) data packets; and transmitting the UDP data packets to a first 10-gigabit network module according to a UDP protocol; wherein the method further comprises:

performing analog-to-digital conversion on received first infrared signal to obtain analog-to-digital converted data;

packing the analog-to-digital converted data into a transmitting-end remote control UDP packet;

transmitting the transmitting-end remote control UDP packet to the first 10-gigabit network module;

unpacking a receiving-end remote control UDP packet to obtain unpacked data, when acquiring, via the first 10-gigabit network module, the receiving-end remote control UDP packet transmitted by a receiving device; and performing digital-to-analog conversion on the unpacked data to obtain a first conversion result, and controlling, according to the first converted result, the transmitting-end infrared emission tube to transmit infrared signal.

2. The method according to claim 1, wherein the compression algorithm is a display stream compression (DSC) algorithm or a variable length coding (VLC) compression algorithm.

3. The method according to claim 1, wherein the first 10-gigabit network module is configured to transmit the UDP data packets to a receiving device or a 10-gigabit switch.

4. The method according to claim 1, further comprising:
acquiring transmitting-end control data; wherein
packing the compressed data into the UDP data packets comprises:
encapsulating the compressed data and the transmitting-end control data into a data frame according to a preset protocol; and
packing the data frame into the UDP data packets.

5. The method according to claim 1, further comprising:
acquiring receiving-end UDP data packets from the first 10-gigabit network module;
unpacking the receiving-end UDP data packets to obtain a data frame, wherein the data frame comprises receiving-end control data; and
executing corresponding task in response to the receiving-end control data.

6. The method according to claim 1, wherein a port number corresponding to the UDP data packet is different from that of the transmitting-end remote control UDP packet, and the port number corresponding to the UDP data packet is different from that of the receiving-end remote control UDP packet.

7. A method of receiving ultra high definition video, comprising:
acquiring, according to a UDP protocol, UDP data packets from a second 10-gigabit network module;
unpacking the UDP data packets to obtain data to be decompressed; and
decompressing, by a decompression algorithm, the data to be compressed to obtain data of the ultra high definition video; wherein
the method further comprises:
performing analog-to-digital conversion on received infrared signal to obtain analog-to-digital converted data;
packing the analog-to-digital converted data into a receiving-end remote control UDP packet;
transmitting the receiving-end remote control UDP packet to the second 10-gigabit network module;
unpacking a transmitting-end remote control UDP packet to obtain unpacked data, when acquiring, via the second 10-gigabit network module, the transmitting-end remote control UDP packet transmitted by a transmitting device; and
performing digital-to-analog conversion on the unpacked data to obtain a second conversion result and controlling, according to the second conversion result, a receiving-end infrared emission tube to transmit infrared signal in response to the second conversion result.

8. The method according to claim 7, wherein the decompression algorithm is a display stream compression (DSC) decompression algorithm or a variable length coding (VLC) decompression algorithm.

9. The method according to claim 7, wherein the second 10-gigabit network module is configured to acquire the UDP data packets from a transmitting device or acquiring, from a 10-gigabit switch, the UDP data packets transmitted by the transmitting device.

10. The method according to claim 7, wherein unpacking the UDP data packets to obtain the data to be decompressed comprises:
unpacking the UDP data packets to obtain a data frame, wherein the data frame comprises the data to be decompressed and transmitting-end control data; wherein
the method further comprises:
playing the ultra high definition video according to the transmitting-end control data.

11. The method according to claim 7, further comprising:
acquiring receiving-end control data;
encapsulating the receiving-end control data into a data frame according to a preset protocol;
packing the data frame into a receiving-endUDP data packet; and
transmitting the receiving-end UDP data packet to the second 10-gigabit network module.

12. A device of transmitting ultra high definition video, comprising:
a HDMI input interface configured to acquire ultra high definition video;
a compressing module connected with the HDMI input interface and configured to compress data in the ultra high definition video to obtain compressed data;
a user datagram protocol (UDP) transmitting module connected with the compressing module and configured to pack the compressed data into UDP data packets; and
a first 10-gigabit network module connected with the UDP transmitting module and configured to transmit the UDP data packets; wherein
the device further comprises:
a transmitting-end infrared receiving tube configured to receive infrared signal;
a first analog-to-digital converting module configured to perform analog-to-digital conversion on the infrared signal received by the transmitting-end infrared receiving tube to obtain analog-to-digital converted data;
a first digital-to-analog converting module; and
a transmitting-end infrared emission tube; wherein
the UDP transmitting module is further configured to pack the analog-to-digital converted data into a transmitting-end remote control UDP packet, and transmit the transmitting-end remote control UDP packet to the first 10-gigabit network module; or the device further comprises: the first digital-to-analog converting module; and the transmitting-end infrared emission tube; wherein the UDP transmitting module is further configured to acquire, via the first 10-gigabit network module, a receiving-end remote control UDP packet from a receiving device, and to unpack the receiving-end remote control UDP packet to obtain unpacked data; and the first digital to analog converting module is configured to perform digital-to-analog conversion on the unpacked data to obtain a first conversion result and to control, according to the first converted result, the transmitting-end infrared emission tube to transmit infrared signal.

13. The device of claim 12, further comprising:

a first communication unit connected between a first control device and the UDP transmitting module; wherein the UDP transmitting module is configured to acquire transmitting-end control data through the first communication unit and to pack the compressed data and the transmitting-end control data into the UDP data packets.

14. A device of receiving ultra high definition video, comprising:

a second 10-gigabit network module configured to acquire a UDP data packet;

a UDP receiving module connected with the second 10-gigabit network module and configured to acquire the UDP data packet from the second 10-gigabit network module according to a UDP protocol and to unpack the UDP data packet to obtain data to be decompressed;

a decompressing module connected with the UDP receiving module and configured to decompress the data to be decompressed to obtain data of the ultra high definition video; and a HDMI output interface connected with the decompressing module and configured to output the ultra high definition video.

15. The device of claim 14, further comprising:

a second communication unit connected between a second control device and the UDP receiving module, wherein the UDP receiving module is further configured to receive, via the second communication unit, receiving-end control data, to pack the receiving-end control data into receiving-end UDP data packets, and to transmit the receiving-end UDP data packets to the second 10-gigabit network module.

16. The device of claim 14, further comprising:

a receiving-end infrared receiving tube configured to receive infrared signal; and a second analog-to-digital converting module configured to perform analog-to-digital conversion on the infrared signal received by the receiving-end infrared receiving tube to obtain converted data; wherein the UDP receiving module is further configured to pack the converted data into a receiving-end remote control UDP packet, and to transmit the receiving-end remote control UDP packet to the second 10-gigabit network module.

17. The device of claim 14, further comprising:

a receiving-end infrared emission tube; and a second analog-to-digital converting module; wherein the UDP receiving module is further configured to acquire, via second 10-gigabit network module, a transmitting-end remote control UDP packet transmitted by a transmitting device and to unpack the transmitting-end remote control UDP packet to obtain unpacked data;

the second analog-to-digital converting module is configured to perform analog-to-digital conversion on the unpacked data to obtain a second conversion result, and to control the receiving-end infrared emission tube to transmit infrared signal according to the second conversion result.

* * * * *